US012732383B2

(12) United States Patent
Zhang

(10) Patent No.: US 12,732,383 B2
(45) **Date of Patent: *Sep. 8, 2026**

(54) ENFORCING CONDITIONS ON BLOCKCHAIN TRANSACTIONS

(71) Applicant: nChain Licensing AG, Zug (CH)

(72) Inventor: Wei Zhang, London (GB)

(73) Assignee: nChain Licensing AG, Zug (CH)

( * ) Notice: Subject to any disclaimer, the term of this patent is extended or adjusted under 35 U.S.C. 154(b) by 56 days.

This patent is subject to a terminal disclaimer.

(21) Appl. No.: 18/580,572

(22) PCT Filed: Jun. 20, 2022

(86) PCT No.: PCT/EP2022/066645

§ 371 (c)(1),
(2) Date: Jan. 18, 2024

(87) PCT Pub. No.: WO2023/001460

PCT Pub. Date: Jan. 26, 2023

(65) Prior Publication Data

US 2025/0088370 A1 Mar. 13, 2025

(30) Foreign Application Priority Data

Jul. 19, 2021 (GB) ..................................... 2110345

(51) Int. Cl.
*H04L 9/32* (2006.01)
*G06F 21/64* (2013.01)

(52) U.S. Cl.
CPC ............ *H04L 9/3252* (2013.01); *G06F 21/64* (2013.01)

(58) Field of Classification Search
CPC ....... H04L 9/3252; H04L 9/3297; H04L 9/50; H04L 9/3236; H04L 9/0637; H04L 67/1097; G06F 21/64; G06Q 20/065
See application file for complete search history.

(56) References Cited

U.S. PATENT DOCUMENTS

2011/0066859 A1* 3/2011 Iyer ..................... H04W 12/106 713/181
2019/0207760 A1* 7/2019 Hennebert ......... G06Q 20/3672
(Continued)

FOREIGN PATENT DOCUMENTS

CA 2732726 C * 8/2017 ............. H04L 9/003
CN 112667619 A 4/2021
(Continued)

OTHER PUBLICATIONS

Swambo et al., "Bitcoin Covenants: Three Ways to Control the Future" (Year: 2020).*
(Continued)

*Primary Examiner* — Jalatee Worjloh
(74) *Attorney, Agent, or Firm* — Galvani Smith PLLC; Rowan P. Smith

(57) ABSTRACT

A computer-implemented method of enforcing conditions on a second blockchain transaction using a first blockchain transaction, wherein a first one of the conditions is that, when a first unlocking script of the second transaction is executed alongside a first locking script of the first transaction, a representation of the second transaction is output to memory, wherein the representation is based on a plurality of fields of the second transaction and a first output of the first transaction, and wherein the method comprises: generating the first transaction, wherein the first transaction comprises a first output, wherein the first output comprises the first locking script, and wherein the first locking script comprises: a message sub-script; a signature sub-script; a public key corresponding to a private key; and a verification sub-script.

20 Claims, 7 Drawing Sheets

(56) References Cited

U.S. PATENT DOCUMENTS

| | | | | |
|---|---|---|---|---|
| 2020/0099528 | A1* | 3/2020 | Chan | H04L 9/30 |
| 2022/0078028 | A1* | 3/2022 | Pettit | H04L 9/3236 |
| 2024/0013213 | A1 | 1/2024 | Trock | |

FOREIGN PATENT DOCUMENTS

| | | | | |
|---|---|---|---|---|
| JP | 2020522047 | A | 7/2020 | |
| JP | 2020532221 | A | 11/2020 | |
| WO | 2018215871 | A1 | 11/2018 | |
| WO | 2018215872 | A1 | 11/2018 | |
| WO | 2018215873 | A1 | 11/2018 | |
| WO | 2018215875 | A1 | 11/2018 | |
| WO | 2018215947 | A1 | 11/2018 | |
| WO | 2019043536 | A1 | 3/2019 | |
| WO | 2019043537 | A1 | 3/2019 | |
| WO | 2019043538 | A1 | 3/2019 | |
| WO | 2020016700 | A1 | 1/2020 | |
| WO | WO-2020008388 | A1 * | 1/2020 | G06Q 20/223 |
| WO | WO-2020114977 | A1 * | 6/2020 | H04L 9/50 |
| WO | 2020240295 | A | 12/2020 | |
| WO | 2020240299 | A | 12/2020 | |
| WO | 2020240321 | A1 | 12/2020 | |
| WO | 2021014233 | A1 | 1/2021 | |
| WO | 2022118263 | A1 | 6/2022 | |

OTHER PUBLICATIONS

O'Connor Russell et al: "Enhancing Bitcoin Transactions with Covenants", Nov. 19, 2017 (Nov. 19, 2017), SAT 2015 18th International Conference, Austin, TX, USA, Sep. 24-27, 2015; [Lecture Notes in Computer Science; Lect.Notes Computer], Springer, Berlin, Heidelberg, pp. 191-198.*

Bartoletti Massimo et al: "Bitcoin Covenants Unchained" , Oct. 27, 2020 (Oct. 27, 2020), Arxiv.org, Cornell University Library, 201 Olin Library Cornell University :Ithaca, NY 14853, pp. 25-42, section 5.

GB2110345.2 Combined Search and Examination Report dated Dec. 31, 2021, 9 pages.

GB2110348.6 Combined Search and Examination Report dated Dec. 31, 2021, 9 pages.

PCT/EP2022/06649 International Search Report and Written Opinion dated Sep. 22, 2022, 15 pages.

PCT/EP2022/066645 International Search Report and Written Opinion dated Sep. 23, 2022, 13 pages.

Scrypt, "OP_PUSH_TX", Medium.com, Mar. 23, 2020, sCrypt, URL: https://xiaohuiliu.medium.com/op-push-tx-3d3d279174c1.

Extended European Search Report for Application No. 26160919.2, dated May 21, 2026, 8 Pages.

Office Action for Japanese Patent Application No. 2024-503451, mailed on Apr. 7, 2026, 6 pages.

* cited by examiner 150
151n-1
151n
153
152
Block pointer
155
152
154
Gb
Tx
152j
Block Bn-1
Block Bn
Pool
152i
Blockchain
(maintained at each node)
104
101
Validate and propagate Tx
Race to create blocks
104
104
152j
152j
Nodes of P2P network
106
Send Tx to be propagated
Internet
Side channel
105a
107
102b
102a
105b
103a
103b
Alice
(payer)
Bob
(payee)

Figure 6

| $TxID_0$ | | | | |
|---|---|---|---|---|
| Version | 1 | | Locktime | 0 |
| In-count | 1 | | Out-count | 1 |
| Input list | | | Output list | |
| Outpoint | Unlocking script | nSeq | Value | Locking script |
| $Outpoint_A$ | $< Sig_A >$<br>$< PK_A >$ | FFFFFFFF | 1000 | [outputsRequest][sign] OP_CHECKSIGVERIFY OP_SWAP <0x68> OP_SPLIT OP_NIP OP_8 OP_SPLIT OP_SWAP OP_CAT OP_EQUALVERIFY OP_DUP OP_HASH160 <H(PK_B)> OP_EQUALVERIFY OP_CHECKSIG |

Figure 7

| $TxID_1$ | | | | |
|---|---|---|---|---|
| Version | 1 | | Locktime | 0 |
| In-count | 1 | | Out-count | 1 |
| Input list | | | Output list | |
| Outpoint | Unlocking script | nSeq | Value | Locking script |
| $TxID_0 \| \| 0$ | $< Sig_B >$<br>$< PK_B >$<br>$< Data_1 >$<br>$< Data_2 >$ | FFFFFFFF | 1000 | [outputsRequest][sign] OP_CHECKSIGVERIFY OP_SWAP <0x68> OP_SPLIT OP_NIP OP_8 OP_SPLIT OP_SWAP OP_CAT OP_EQUALVERIFY OP_DUP OP_HASH160 <H(PK_B)> OP_EQUALVERIFY OP_CHECKSIG |

Figure 8

<table>
<tr><td colspan="5">$TxID_1$</td></tr>
<tr><td>Version</td><td colspan="2">1</td><td>Locktime</td><td>0</td></tr>
<tr><td>In-count</td><td colspan="2">1</td><td>Out-count</td><td>1</td></tr>
<tr><td colspan="3">Input list</td><td colspan="2">Output list</td></tr>
<tr><td>Outpoint</td><td>Unlocking script</td><td>nSeq</td><td>Value</td><td>Locking script</td></tr>
<tr><td>$TxID_0||0$</td><td>$< Sig_B >$<br>$< PK_B >$<br>$< Data_1 >$<br>$< Data_2 >$<br>$< Data_3 >$</td><td>FFFFFFFF</td><td>1000</td><td>[outputsRequest][sign] OP_CHECKSIGVERIFY OP_SWAP <0x68> OP_SPLIT OP_NIP OP_8 OP_SPLIT OP_SWAP OP_CAT OP_EQUALVERIFY OP_DUP OP_HASH160 <H(PK_B)> OP_EQUALVERIFY OP_CHECKSIG</td></tr>
</table>

ENFORCING CONDITIONS ON BLOCKCHAIN TRANSACTIONS

CROSS REFERENCE TO RELATED APPLICATIONS

This application is the U.S. National Stage of International Application No. PCT/EP2022/066645 filed on Jun. 20, 2022, and published as WO 2023/001460, which claims the benefit of United Kingdom Patent Application No. 2110345.2, filed on Jul. 19, 2021, the contents of which are incorporated herein by reference in their entireties.

TECHNICAL FIELD

The present disclosure relates to a method of enforcing conditions on a blockchain transaction. More specifically, a first blockchain transaction is used to enforce one or more conditions on a second, different blockchain transaction.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

There are existing techniques for enforcing conditions on a blockchain transaction using another a transaction. For example, it is possible to enforce conditions on the inputs and/or outputs of a future transaction that is attempting to unlock an output of an earlier transaction, whereby the output of the earlier transaction is at least partially responsible for enforcing those conditions. The conditions may include, for instance, that an input and/or output of the future transaction include certain data or take a certain format.

One technique used to enforce conditions on a future transaction is generally known as "PUSHTX", or "OP_PUSHTX". PUSHTX is a pseudo-opcode, i.e. it is not a single opcode of a blockchain scripting language (e.g. Script) but rather a collection of opcodes (or functions more generally) that together are configured to perform a corresponding collection of operations when executed. The PUSHTX technique was first disclosed in international patent applications PCT/IB2018/053335, PCT/IB2018/053337, PCT/IB2018/053339, PCT/IB2018/053336, PCT/IB2018/056430, PCT/IB2018/056432 and PCT/IB2018/056431. The core idea of PUSHTX is to generate a signature in-script on a data element on the stack and call OP_CHECKSIG to verify the signature. If it passes, it implies that the message constructed by OP_CHECKSIG is identical to the data element pushed to the stack. Therefore, it achieves the effect of pushing the current spending transaction (i.e. the future transaction that is unlocking an output of an earlier transaction) to the stack. Pushing the current transaction to the stack enables the enforcement of conditions, e.g. by checking that certain fields (e.g. inputs, outputs, locktime, etc.) of the current transaction include certain data, values, opcodes, scripts, etc.

The present disclosure provides several optimisations of the PUSHTX technique. However it should be understood that there are other similar techniques for pushing transactions to the stack, which the skilled person will be familiar with, and that the embodiments of the present disclosure may apply generally to any of those techniques, and not just to PUSHTX.

According to one aspect disclosed herein, there is provided a computer-implemented method of enforcing conditions on a second blockchain transaction using a first blockchain transaction, wherein a first one of the conditions is that, when a first unlocking script of the second transaction is executed alongside a first locking script of the first transaction, a representation of the second transaction is output to memory, wherein the representation is based on a plurality of fields of the second transaction and a first output of the first transaction, and wherein the method comprises: generating the first transaction, wherein the first transaction comprises a first output, wherein the first output comprises the first locking script, and wherein the first locking script comprises: a message sub-script configured to, when executed, output to memory a candidate message representing the second transaction, wherein the candidate message is based on a plurality of candidate fields of the first and second transactions, wherein one or more of said candidate fields are included in the first unlocking script of the second transaction; a signature sub-script configured to, when executed, generate a signature, wherein the signature is a function of at least the candidate message, a private key, and an ephemeral private key, and wherein the ephemeral private key is fixed by the first locking script as being equal to one and/or wherein the ephemeral private key is fixed as being equal to the private key; a public key corresponding to the private key; and a verification sub-script configured to, when executed, i) construct a target message representing the second transaction, wherein the target message is based on a plurality of fields of the second transaction and the first output of the first transaction, and ii) use the public key to verify that the signature is valid for the target message, wherein verifying that the signature is valid for the target message, verifies that the target message matches the candidate message, thereby verifying that the candidate message output to memory is the representation of the second transaction.

The locking script of the first transaction and the unlocking script of the second transaction will be executed during validation of the second transaction. The locking script of the first transaction comprises a series of sub-scripts, each configured to perform one or more operations. A sub-script is merely a label for a particular set of functions (e.g. opcodes) and, optionally, a set of data items, e.g. a public key or public key hash.

A message sub-script is configured to output a candidate message to memory, e.g. a stack. The message is a "candidate message" in the sense that, if it has been constructed correctly, then it will match another message, referred to herein as a "target message". The candidate message is based on a candidate plurality of fields (e.g. input(s), output(s), etc.) of the second transaction (e.g. all of the fields of the second transaction) and a candidate first output the first transaction, i.e. the output containing the first locking script. Here, the fields and output are "candidates" in the sense that they are included as data items (either in the locking script of the first transaction or unlocking script of the second transaction) and are purported to be correct fields of the first and second transactions. For instance, a candidate length of the locking script may be included in the unlocking script of the second transaction.

A signature sub-script is configured to generate a digital signature (e.g. an ECDSA signature) based on the candidate message, a private key and an ephemeral private key. In some embodiments, the ephemeral private key is fixed as being equal to one. Conventionally, an ephemeral private key is a large number, and given that the ephemeral private key is typically required several times during the generation of a signature, fixing the ephemeral private key to one reduces the storage size of the locking script and simplifies the signature generation process. The signature generation process is simplified as any mathematical operation involving the ephemeral private key becomes trivial. The signature sub-script may be optimized even further by fixing both the private key and the ephemeral private key as being equal to one. This further reduces the storage size of the locking script and reduces the computational complexity of the signature generation process. In additional or alternative embodiments, the ephemeral private key and the private key are fixed in the locking script as being equal to the same value (not necessarily a value of one, though that is of course an option as already mentioned). These embodiments offer significant savings for similar reasons. As will be described later, the inventors of the present disclosure have recognised that these savings are possible without compromising the security of the first or second transactions.

A verification sub-script (which in some cases may be a single function, e.g. opcode) is configured to construct a target message based on the actual fields of the first and second transactions, e.g. the actual first output of the first transaction, the actual outputs of the second transaction, etc. The verification sub-script also verifies that the signature generated by the signature sub-script is valid for the target message. If the signature is valid, then the candidate message is necessarily the same as the target message. Therefore the candidate message that was output to memory is the target message, which is a representation of the second transaction. In other words, passing the signature check is only possible if the two messages are identical, and therefore verifying the signature verifies that the candidate message and the target message are equal.

Having output the second transaction to memory (e.g. the stack), further checks can be made so as to enforce further conditions. For instance, embodiments of the present disclosure may be used to construct a perpetually enforcing locking script (PELS), where a PELS is a locking script that enforces some condition or conditions on all future transactions in the chain of transactions that originate from the output that contains the locking script. For example, a PELS may be used to force the locking script in the spending transaction to be the same as itself. PELS are particularly useful for the sender (i.e. creator of the transaction containing the first instance of the PELS) as they can be ensured that all future spending transaction will follow the rules which they set out in the locking script. Any violation of the rules would invalidate the transaction validation in terms of script execution. Effectively, the sender can withdraw from all future transactions by delegating the validation work to blockchain nodes.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 6 illustrates an example of a first transaction configured to enforce conditions on a second transaction, FIG. 7 illustrates an example of the second transaction, and FIG. 8 illustrates an example of a second transaction where the first transaction is optimised to generate part of the candidate message from another part.

DETAILED DESCRIPTION OF EMBODIMENTS

1. Example System Overview

Figure 1:
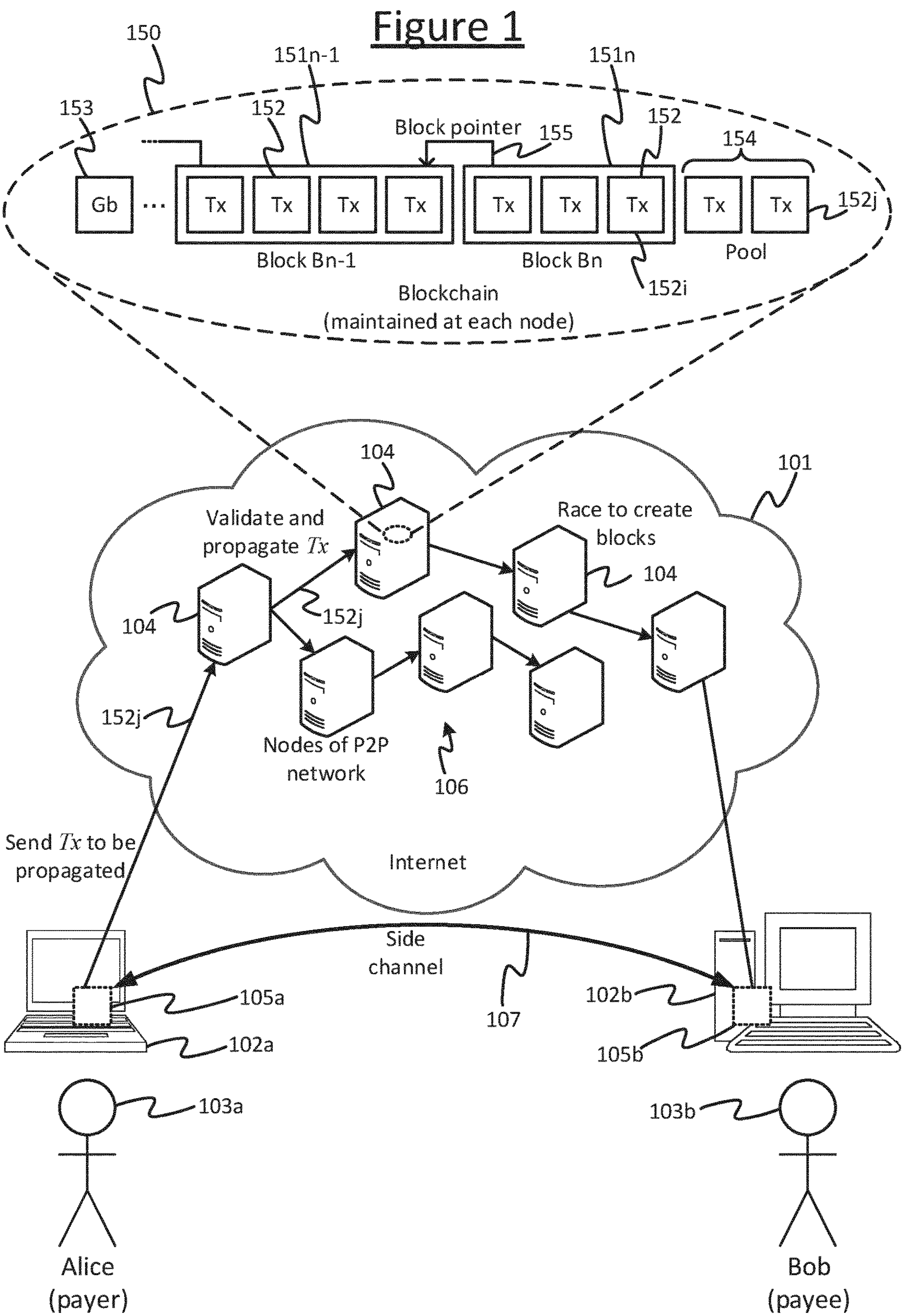
FIG. 1 is a schematic block diagram of a system for implementing a blockchain, FIG. 2 schematically illustrates some examples of transactions which may be recorded in a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and 37 second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction **152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152**. Alternatively the condition could simply be a built-in feature of the node protocol, or be defined by a combination of the script and the node protocol.

On condition that the newly received transaction **152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106**.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction **152*j*). Once the proof-of-work has been done for the pool 154 including the new transaction 152*j*, it immutably becomes part of one of the blocks 151 in the blockchain 150. Each transaction 152** comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

2. UTXO-Based Model

Figure 2:
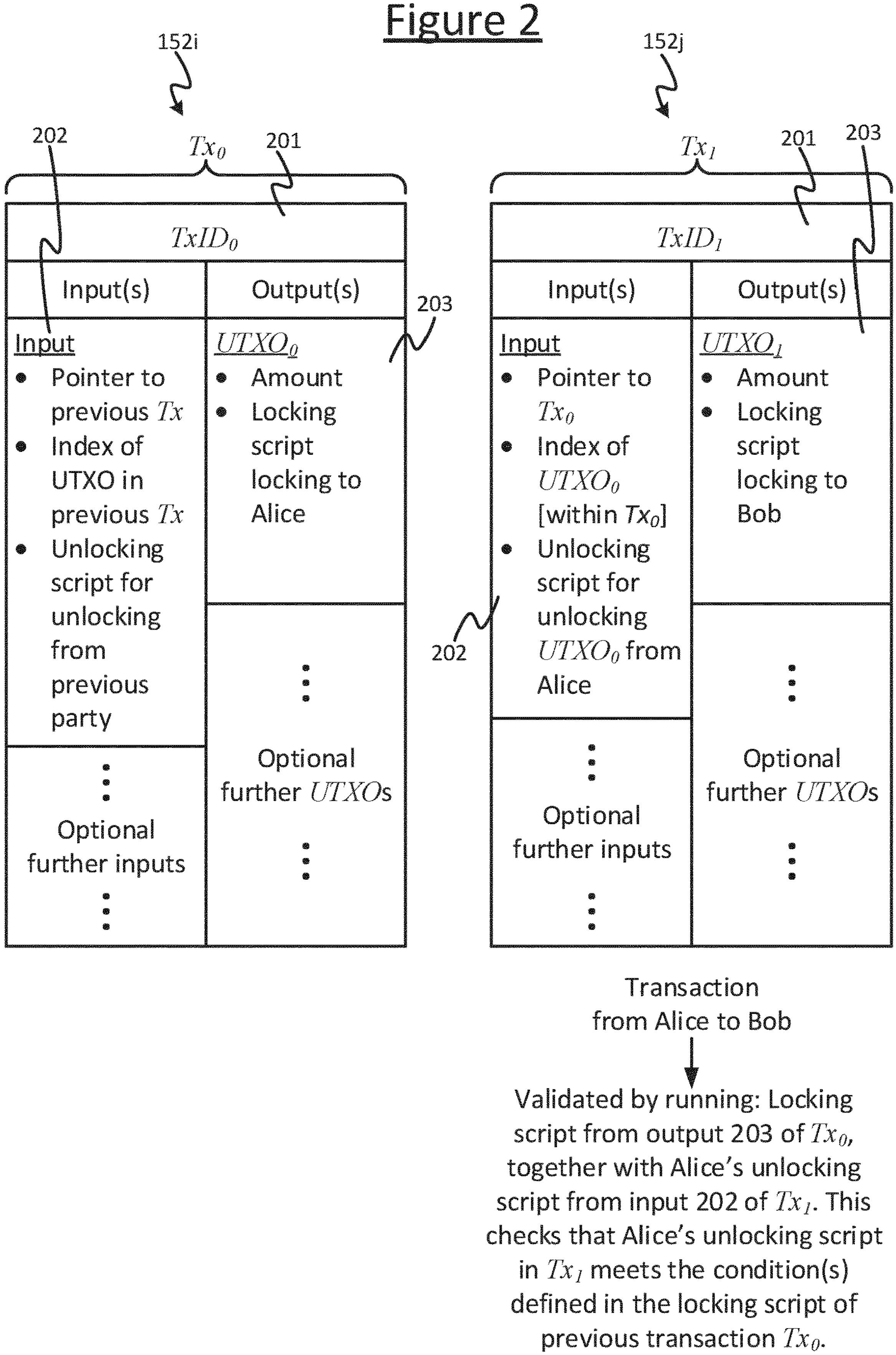

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol.

However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

3. Side Channel

As shown in FIG. 1, the client application on each of Alice and Bob's computer equipment 102*a*, 120*b*, respectively, may comprise additional communication functionality. This additional functionality enables Alice 103*a* to establish a separate side channel 107 with Bob 103*b* (at the instigation of either party or a third party). The side channel 107 enables exchange of data separately from the blockchain network. Such communication is sometimes referred to as "off-chain"

communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102*a*, 102*b*. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

4. Client Software

Figure 3A:
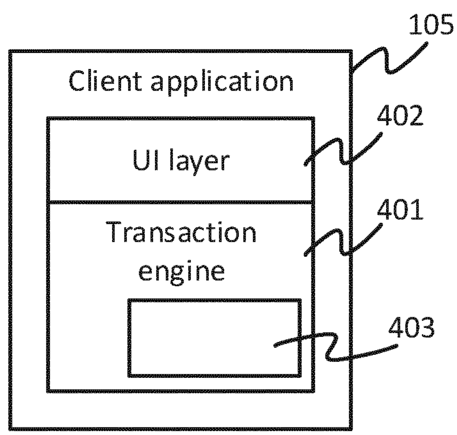
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
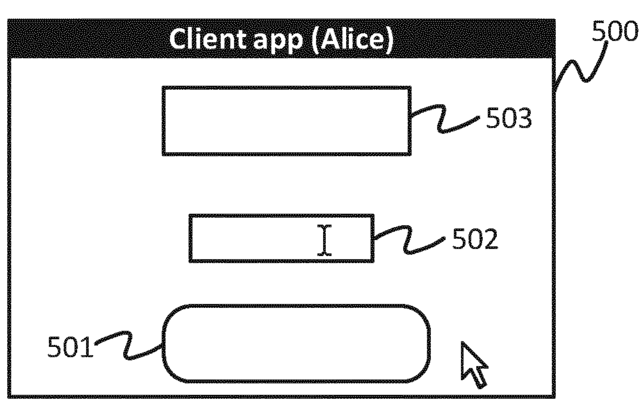
FIG. 3B is a schematic mock-up of an example user interface that may be presented by the client application of FIG. 3A.

FIG. 3B gives a mock-up of an example of the user interface (UI) 500 which may be rendered by the UI layer 402 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands).

Alternatively or additionally, the UI elements may comprise one or more data entry fields 502. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

5. Node Software

Figure 4:
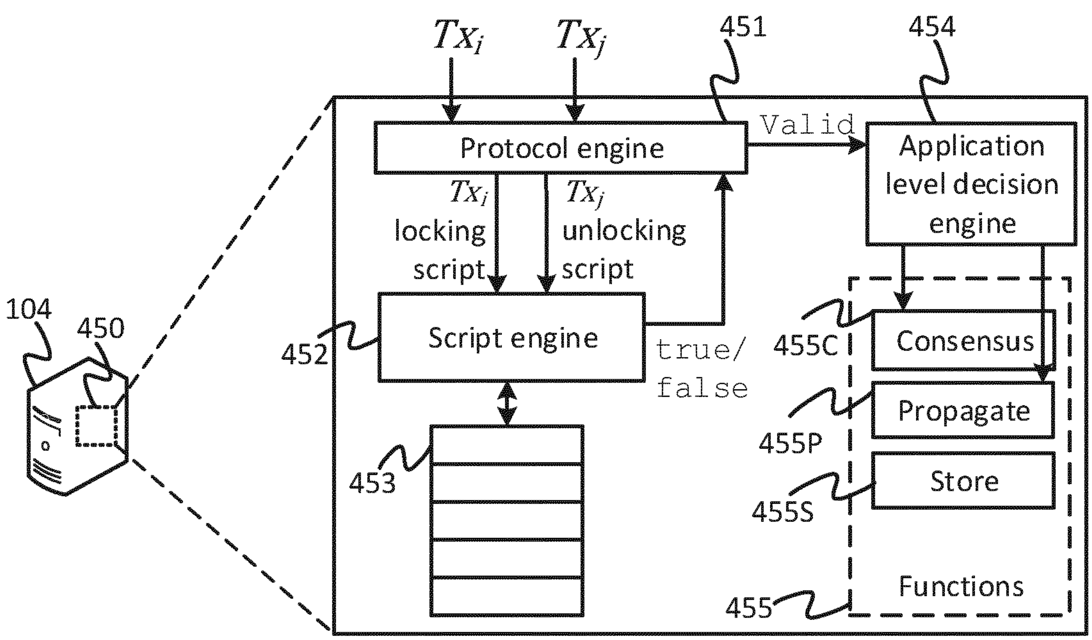
FIG. 4 is a schematic block diagram of some node software for processing transactions.

FIG. 4 illustrates an example of the node software 450 that is run on each blockchain node 104 of the network 106, in the example of a UTXO-or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152*j* ($Tx_j$) is received having an input pointing to an output (e.g. UTXO) of another, preceding transaction 152*i* ($Tx_{m-1}$), then the protocol engine 451 identifies the unlocking script in $Tx_j$ and passes it to the script engine 452. The protocol engine 451 also identifies and retrieves $Tx_i$ based on the pointer in the input of $Tx_j$. $Tx_i$ may be published on the blockchain 150, in which case the protocol engine may retrieve $Tx_i$ from a copy of a block 151 of the blockchain 150 stored at the node 104. Alternatively, $Tx_i$ may yet to have been published on the blockchain 150. In that case, the protocol engine 451 may retrieve $Tx_i$ from the ordered set 154 of unpublished transactions maintained by the node 104. Either way, the script engine 451 identifies the locking script in the referenced output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

6. Enforcing Conditions on a Blockchain Transaction

Figure 5:
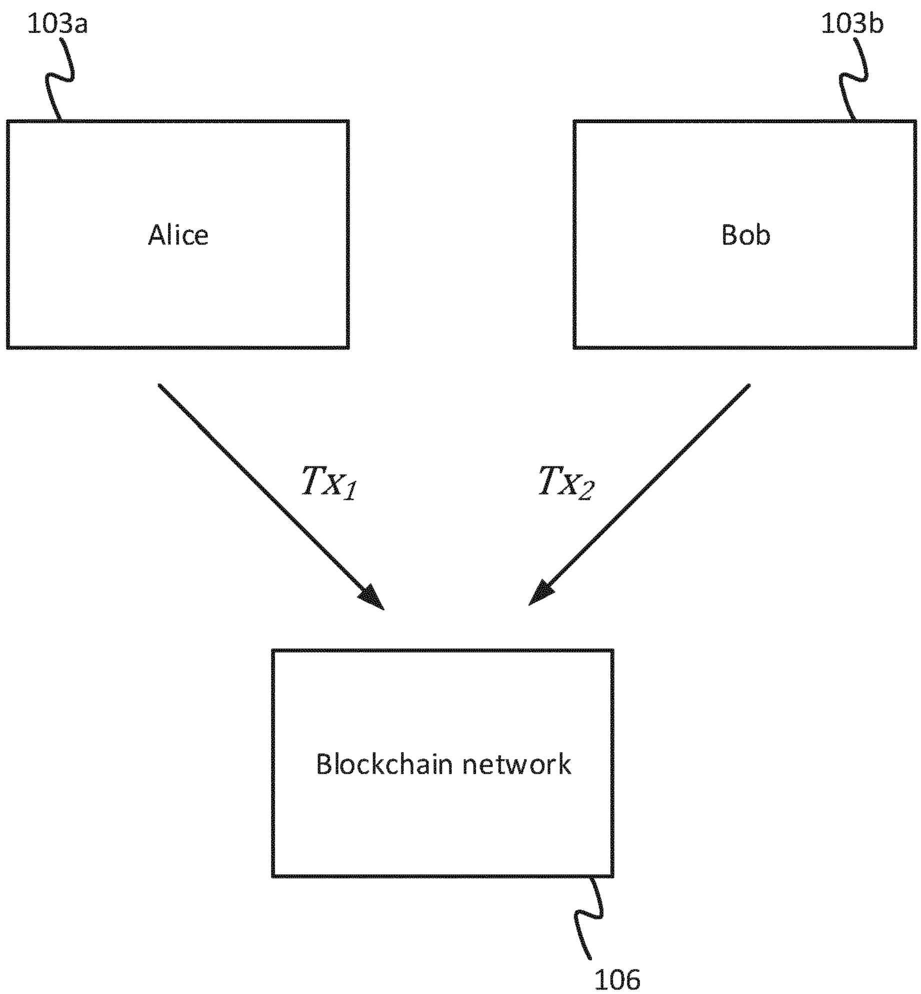
FIG. 5 is a schematic block diagram of an example system for implementing embodiments of the present disclosure.

Embodiments of the present disclosure enable one transaction to enforce (i.e. impose) conditions on another transaction. The transaction that enforces the conditions will be referred to as the "first transaction" and the transaction that is having the conditions enforced on it will be referred to as the "second transaction". The conditions are enforced in the sense that the second transaction will not be successfully validated by a blockchain node 104 during transaction validation unless the conditions are met. FIG. 5 illustrates an example system for implementing said embodiments. As shown, the system includes a first party configured to generate the first transaction, a second party configured to generate the second transaction, and one or more blockchain nodes of a blockchain network 106. For convenience, the first party will be referred to as Alice 103*a* and the second party will be referred to as Bob 103*b*. In general, both the first party and the second party may be configured to perform any of the actions described above as being performed by Alice 103*a* and/or Bob 103*b*. The system may include other entities (not shown), e.g. additional users.

As mentioned, Alice 103*a* is configured to generate the first transaction. The first transaction includes a first output. The first output does not necessarily have to appear logically first in the list of outputs of the first transaction, although that is one possibility. The first output includes a locking script, which will be referred to as the "first locking script". The first locking script is configured to enforce one or more conditions on any transaction that is attempting to unlock the first output, which is the second transaction in this example scenario. At least one of those conditions is that a representation of the second transaction is output to memory during execution (e.g. validation) of the second transaction. That is, the first transaction (and specifically the first locking script of the first transaction) has the effect of ensuring that the representation of the second transaction will be output to memory when an unlocking script of the second transaction is executed alongside the first locking script. For convenience, the unlocking script of the second transaction that is executed together with the first locking script of the first transaction will be referred to as the "first unlocking script", which is included in a first input of the second transaction. The first input does not necessarily have to appear logically first in the list of inputs of the second transaction, although that is one possibility.

The representation of the second transaction may vary depend on the particular blockchain that the transactions form a part of. Generally, the representation of the second transaction is based on a plurality of fields of the second transaction and the first output of the first transaction. In other words, the representation of a current transaction is based on both the current transaction and the output of a previous transaction that is being unlocked, i.e. spent, assigned, transferred, etc. As will be discussed further below, outputting a representation of the second transaction to memory allows checks to be performed on some or all of the second transaction, and therefore further conditions may be enforced, e.g. by checking that those conditions have been met and causing the transaction execution to fail if they have not.

The first locking script includes sub-scripts that together are configured to ensure that the representation that is output to memory is indeed an accurate representation of the second transaction.

A first one of the sub-scripts is referred to as a "message sub-script". The message sub-script may appear logically first in the first locking script, or there may be other sub-scripts included in the first locking script that appear before the first locking script. The message sub-script is configured to output a candidate message to memory. The candidate message is based on several "candidate fields" of the second transaction, as well as a "candidate first output" of the first transaction. The candidate message is a "candidate" in the sense that at the point that it is output to memory, it is not yet known (or at least has not yet been verified in-script) that the candidate message has been constructed based on the actual fields of the second transaction and the actual first output of the first transaction. The candidate fields and the candidate first output are candidates in a similar sense, i.e. that until verified in-script it is not known that they are correct.

At least some of the candidate fields are included in the first unlocking script of the second transaction. Each candidate field may be a separate data item, or a data item may comprise more than one candidate field. Part or all of the candidate first output (e.g. value assigned to the first output, the first locking script of the first output, the length of the first locking script of the first output) may also be included in the first unlocking script. In some embodiments, one or more of the candidate fields of the second transaction may be included in the first locking script of the first transaction. As discussed below, any candidate field upon which the candidate message is based that is included in the first locking script must necessarily be included in the second transaction. Thus, the condition may be enforced that the second transaction must include those candidate field(s). As an example, the first locking script may fix the locktime of the second transaction by including a candidate locktime upon which the candidate message is based. Optionally, part (but not all) of the candidate first output may be included in the first output of the first transaction.

In some embodiments, the message sub-script may be configured to construct some or all of the candidate message. For instance, the message sub-script may combine (e.g. concatenate) one or more data items that are included in the first locking script and/or first unlocking script, where each data item comprises one or more candidate fields and or (part of) the candidate first output.

The first locking script also includes a signature sub-script that is configured to generate a signature based on the candidate message. The signature is also generated based on a private key and an ephemeral private key, which are both fixed by (e.g. included as part of) the first locking script. The signature may be an ECDSA signature. Note that the private key and ephemeral private key need not necessarily be included in the first locking script to be "fixed" by the first locking script. For instance, the first locking script may include a value that is based on the private key and/or ephemeral private key that therefore fixes that private key and/or ephemeral private key. In some embodiments, the ephemeral private key is fixed as being equal to one. This offers a significant space saving compared to conventional ephemeral private keys, which is normally a 256 bit integer. In addition, the private key may also be fixed as being equal to one, thus offering a further space saving (private keys are also normally 256 bit integers). As an alternative to both the private key and the ephemeral private key both being fixed as being equal to one, they may be fixed as being equal to one another, e.g. both may take a value of two, or another small number. The signature generation process is simplified as the same value is used for both keys.

The first locking script also includes a verification sub-script. The verification sub-script is configured to construct a target message representing the second transaction. The target message is based on a plurality of fields of the second transaction. The target message is based on the actual of fields of the second transaction, i.e. as taken from or generated based on the second transaction itself. The target message is based on the same set of fields of the second transaction as the candidate message. For example, the candidate message and the target message may be based on one or more inputs of the second transaction. The target message is also based on the actual first output of the first transaction, i.e. as taken form the first transaction itself.

The verification sub-script is also configured to verify that the signature that has been generated by the signature sub-script is a valid signature for the target message. The signature is validated using a public key corresponding to the private key. The public key is included in the first locking script, e.g. as part of the verification sub-script. If the signature (which was generated based on the candidate message) is a valid signature for the target message, the consequence is that the candidate message and the target message are the same message, and therefore that the candidate message is based on the actual fields of the second transaction and the actual first output of the first transaction. Therefore the candidate message that is output to memory by the message sub-script is a representation of the second transaction, and the condition that the representation of the second transaction is output to memory during script-execution is fulfilled. Conversely, if the signature verification fails, then the candidate message is not the same as the target message and is therefore not the required representation of the second transaction.

To summarise, Alice 103*a* creates a transaction that has a locking script, whereby in order for the locking script to be unlocked, a representation of the spending transaction must be output to memory (e.g. a stack) during execution. In examples where the memory is stack-based, the verification sub-script may comprise an OP_CHECKSIG or an OP_CHECKSIGVERIFY opcode that is configured to verify that the signature is valid for the target message. OP_CHECKSIG outputs 1 or 0 to the stack depending on whether the signature is a valid (1) or not (0). 0 indicates that the signature is not valid. OP_CHECKSIGVERIFY consumes the output and causes the execution to fail if it is 0.

As mentioned above, the signature may comprise an ECDSA signature. The skilled person will be familiar with ECDSA signatures per se. The signature may take the form $s=k^{-}1(z+ra) \bmod n$, where k is the ephemeral private key, a is the private key, z is a hash of the candidate message, n is the integer order of the elliptic curve generator point G, and r is the x-coordinate of an ephemeral public key modulo n.

As also mentioned above, at least the ephemeral private key k may be set to one to optimise the signature generation. To further optimise the signature generation, the private key a may also be set to one.

Fixing both the private key and the ephemeral private key to one allows the signature to take the form $s=z+G_x \bmod n$, where $G_x$ is the x-coordinate of the elliptic curve generator point G. This has the effect of G being both the ephemeral public key and the public key. The first locking script (e.g. the signature sub-script) may comprise respective values of $G_x$ and n, and may be configured to generate the signature based on those values.

In some examples, the signature sub-script may be configured to use the values of $G_x$ and n more than once. In examples where the memory is tack based, rather than including $G_x$ and n in the first locking script multiple times, to save space, the first locking script (e.g. the signature sub-script) may be configured to output the values of $G_x$ and n to an alternative stack (i.e. a stack other than the main stack on which the first locking script is first placed), and to retrieve the values of $G_x$ and n from the alternative stack when needed.

A saving is made when both the private key and the ephemeral private key are both fixed as the same value, even when that value is not one. That is because when the signature takes the form of an ECDSA signature or an equivalent scheme, the signature is calculated based on an inverse of the ephemeral private key and the private key. Thus fixing both keys to be the same value has the effect that the multiplication is cancelled, thus removing two mathematical operations from the process. Calculating the signature in script is therefore simplified. In addition, a saving from "a=k" also results from the fact that the compressed public key $G_x$ is the same as r in the signature, and therefore the same value can be used twice (e.g. by utilising alt stack as discussed below).

Depending on the particular blockchain protocol of the blockchain network 106, the signature generated by the signature sub-script may require further processing, e.g. to be verified by the verification sub-script. For instance, verification sub-script may comprise a signature verification function (e.g. an opcode) that requires the signature to be in a particular format. As an example, the signature may need to be formatted according to the distinguishing encoding rules (DER). In these examples, the first locking script may comprise a DER sub-script configured to convert the signature generated by the signature sub-script to a DER formatted signature. The DER sub-script may be part of the signature sub-script. The verification sub-script may be configured to verify the DER formatted signature using the public key (which, as mentioned above, may be the generator point G in some examples).

In some examples, the signature sub-script may comprise a signature flag, and the signature sub-script may be configured to associate (e.g. concatenate) the generated signature and the signature flag. The signature flag is sometimes referred to in the art as a "sighash flag". The signature flag indicates which parts of the transaction are signed by the signature. For instance, the signature flag may indicate that only certain inputs and/or outputs are signed by the signature, or that the entire transaction is signed by the signature. In these examples, the verification sub-script is configured to construct the target message based on the signature flag. That is, the verification sub-script is configured to construct the target message based on certain parts of the second transaction depending on the signature flag that is included in the signature sub-script. In order to be deemed a valid signature by the signature sub-script, the candidate fields included in the first unlocking script of the second transaction (and optionally, the first locking script of the first transaction) must result in a candidate message that matches the target message. In other words, the candidate message must be based on the same parts of the second transaction as the target message, wherein those parts are dictated by the signature flag.

As an example, the signature flag may indicate that the target message is to be based on each input and each output of the second transaction. In this case, the signature flag (e.g. sighash flag) may be ALL. As another example, the signature flag may indicate that the target message is to be based on only the input of the second transaction that comprises the first unlocking script and the corresponding output of the second transaction. In this case, the signature flag (e.g. sighash flag) may be SINGLE|ANYONECANPAY.

The following table provides an example format of the candidate (and target) message. The candidate (and target) message may be a concatenation of the items in the table. The items may appear in order based on the corresponding number in the table, e.g. the candidate (and target) message may start with the version number and end with the sighash flag. Note that this is merely an example and is not intended to be limiting in all examples. For example, the items may be concatenated in a different order.

| | Items | Fixed in locking script or not |
|---|---|---|
| 1 | Version number (4 bytes little endian) | Optional |
| 2 | Hash of input outpoints (32 bytes) | Infeasible due to circular reference of TxID |
| 3 | Hash of input sequence numbers (32 bytes) | Optional, recommend not to allow more flexibility in spending transaction |
| 4 | Input outpoint (32 bytes + 4 bytes in little endian) | Infeasible due to circular reference of TxID (although 4 bytes index can be optional) |
| 5 | Length of previous locking script (variable) | Optional, recommend not for simplicity |
| 6 | Previous locking script (variable) | Infeasible due to circular reference of the locking script |
| 7 | Value of previous locking script (8 bytes in little endian) | Optional |
| 8 | Sequence number (4 bytes in little endian) | Optional |
| 9 | Hash of outputs (32 bytes) | Optional if it is known before hand, otherwise, infeasible to be fixed. |
| 10 | Locktime (4 bytes in little endian) | Optional |
| 11 | Sighash flag (4 bytes in little endian) | Recommend being fixed for more restrictiveness |

In this example, the "previous" locking script refers to the first locking script of the first transaction. All other items are taken from or based on the second transaction itself. The table also shows whether the item may be fixed or not in the first locking script. For example, it is not possible to fix the previous (i.e. the first) locking script in the first locking script itself. The first locking script may comprise any of the above items that are possible to fix in the locking script. Note that some of the data items are fields of the first or second transaction (e.g. "locktime" is a field of the second transaction), whereas some of the data items are based on one or more fields of the first or second transaction (e.g. "hash of outputs" is based on the outputs of the second transaction, where each output is a field of the second transaction).

In some examples, the first locking script may be configured to construct part of the candidate message (e.g. one of the items in the table above) based on one or more the candidate fields included in the first unlocking script of the second transaction. That is, the first unlocking script may comprise a set of candidate fields, and the first locking script may process (which may include one or more of combining, concatenating, or hashing, etc.) that set of candidate fields to produce part of the candidate message. For instance, the first unlocking script of the second transaction may comprise the outputs of the second transaction, and the first locking script of the first transaction may combine and hash those outputs to generate a hash of the combined outputs of the second transaction.

In some embodiments, one or more sets of candidate fields that represent a part of the candidate message may be re-used in order to construct a different part of the candidate message. This offers a significant space saving as the one or more sets of candidate fields need only be included a single time in the locking script of the first transaction or the unlocking script of the second transaction, rather than being included multiple times. A further effect of the re-use of the one or more sets of candidate fields is that further conditions may be enforced on the second transaction. For example, as noted above, the candidate message is based on the output of the first transaction that includes the condition enforcing locking script. The unlocking script may include a set of candidate fields (e.g. a value and a locking script) that represent the output of the first transaction. The message sub-script may duplicate the set of candidate fields in order to construct an output of the second transaction. If the signature verification passes, then the candidate message must be the same as the target message, and therefore the second transaction must include an output that matches the output of the first transaction. In other words, the output of the first transaction must appear be included as an output of the second transaction in order for the second transaction to be deemed valid. The same technique may apply for any part of the candidate message (and therefore target message) that comprises or is generated based on the same set of candidate (or actual) fields of the second transaction.

In these embodiments, the message sub-script is configured to construct some or all of the candidate message. For instance, the message sub-script may combine (e.g. concatenate) one or more data items that are included in the first locking script and/or first unlocking script, where each data item comprises one or more candidate fields and or (part of) the candidate first output. More specifically, the message sub-script is configured to construct part of the candidate message based on one or more candidate fields, and to re-use at least some of those one or more candidate fields as a different part of the candidate message. For instance, the one or more candidate fields may be duplicated, used to construct a part of the candidate message, and then used as a different part of the message (or used to construct a different part of the message). As an example, a set of candidate fields (e.g. a candidate output value and a candidate locking script) may be used as part of the candidate message that represents a candidate previous output of the second transaction (i.e. the first output of the first transaction), and re-used as a candidate output of the second transaction. In this example, the candidate message may comprise a candidate hash of the second transaction's outputs, and so the message sub-script may hash the re-used set of candidate fields. The message sub-script may be configured to re-use a single set of candidate fields or to re-use multiple sets of candidate fields. This will depend on the format of the message.

One can see that in order for the second transaction to be valid, then the target message constructed by the verification sub-script must match the candidate message constructed by the message sub-script. Therefore, if a set of candidate fields that are re-used to construct (or re-used as) different parts of the candidate message are fields of the first transaction, then they must also be fields of the second transaction. This is because the target message is based on the actual fields of the second transaction. Therefore the present disclosure may be used to ensure that part (e.g. a locking script, a value, an output, etc.) of the first transaction appears also as the same part of the second transaction. Put another way, a part of the second transaction must be the same as a part of the first transaction. In general, one or more parts of the second transaction may be forced to be the same as one or more parts of the first transaction.

As discussed above, the first locking script is configured to construct part of the candidate message (e.g. one of the items in the table above) based on one or more of the candidate fields included in the first unlocking script of the second transaction. That is, the first unlocking script comprises a set of candidate fields, and the first locking script may process (which may include one or more of combining, concatenating, or hashing, etc.) that set of candidate fields to produce part of the candidate message, whilst re-using that set of candidate fields as a different part of the candidate message. For instance, the first unlocking script of the second transaction may comprise, as candidate fields, data items representing a candidate output of the second transaction, and the first locking script of the first transaction may use the candidate output as items 5, 6 and 7 in the table above (representing the first output of the first transaction), and also to construct item 9 in the table above (representing a hash of an output of the second transaction). In order to do this, the first locking script (or rather, the message sub-script) may combine and hash items 5, 6 and 7 to generate item 9. This enforces the condition that the first output of the first transaction is exactly the same as an output of the second transaction.

Note that this applies generally to any part of the candidate message that may be based on the same set of fields. For instance, the message sub-script may be configured to re-use a candidate locking script as the previous locking script (item 7) and to generate the hash of the output(s) (item 9), without re-using a candidate value of the previous locking script. This enforces the condition that the second transaction must include an output that comprises the first locking script of the first transaction, but that the value of the output can be chosen at will (within the rules of the blockchain protocol).

7. Example Implementation

The following describes an example implementation of the described embodiments.

7.1 Generating the Signature In-Script

One function of the first locking script of the first transaction is to generate the signature for a given message m. The following script segment is part of the first locking script, and the input data can be either in an unlocking script of a future transaction or hard coded in the first locking script.

[sign]:=OP_HASH256 $k^{-1}$ OP_MUL $k^{-1}ra$ OP_ADD n OP_MOD r [toDER] SIGHASH_FLAG OP_SWAP OP_CAT Input data: m The script segment [sign] (referred to above as the "signature sub-script") as part of the locking script may fix both the ephemeral key k and the private key a. Although anyone can generate a valid signature using [sign], the focus is on the input m. The requirement is that there is only one value of m that can pass OP_CHECKSIG for any given spending transaction. If the private key or the public key is not fixed, then the transaction will not be secure. The detail can also be founded in Section 8. If the ephemeral key k is not fixed, then anyone can use a different k to create a valid transaction with different transaction ID, which is not desirable in some use cases.

The value of s in the signature may be calculated as $k^{-1}(z+ra) \bmod n$. As we are not using the signature for authenticity, the private key a and the ephemeral key k can be chosen at will and shown publicly. Given this relaxed case, we can pre-calculate $k^{-1} \bmod n$ and $k^{-1}ra \bmod n$, and include them in the locking script to make the signature generation much more lightweight. Moreover, one can choose small values for k and a such as 1, and they can be the same every time. Note that if k=a=1, then $s=z+G_x \bmod n$, where $G_x$ is the x-coordinate of the generator point G. The compressed public key will be $G_x$ too. The definition of [sign] can be re-written as

[sign]:=OP_HASH256 $G_x$ OP_ADD n OP_MOD $G_x$ [toDER] SIGHASH_FLAG OP_SWAP OP_CAT The script segment [toDER] is to convert the pair (r, s) to the canonical DER format, which is accepted by OP_CHECKSIG. It forces s to be in the range between 0 and n/2 to avoid transaction ID malleability.

Note that SIGHASH_FLAG in [sign] is used to specify which part of the spending transaction should be pushed to the stack. The flag ALL would require all the inputs and outputs to be included in the message m, while SINGLE|ANYONECANPAY would require the input corresponding to this locking script and its paired output to be included in m.

After executing the script segment OP_DUP [sign] <PK> with input m, the stack from bottom to top will look like [m, Sig, PK]. A call to OP_CEHCKSIGVERIFY will consume the signature and the public key, leaving m on the top of the stack. If the verification is successful, then one can be convinced that the message m left on the stack is an accurate representation of the spending transaction.

7.2 Constructing the Message In-Script

The signed message in its serialised format is different from the serialised transaction. The latter gives away all the information about the transaction, while the signed message unintentionally conceals some information about the transaction in hash values and offers some information about the output being spent, i.e., its value and its locking script.

The message m cannot be fully embedded in the locking script as it contains the locking script itself and some unknown information on the future spending transaction. Only some of the fields can be explicitly enforced in the locking script, e.g., version, sequence number, or locktime. The message m is either provided in the unlocking script in its entirety or constructed in script with some inputs from the unlocking script and instructions from the locking script. We will focus on the latter as it is more restrictive from the perspective of a spending transaction. The table above in section 6 captures all the data fields in the message and whether they should or can be fixed in the locking script.

From now on, the data fields in the table will be referred as item 1, 2, 3, etc. When it is optional to include an item in the locking script, whether that item is provided in the locking or unlocking script will depend on the use case. A general rule is that if the data is available or known at the time of creating the locking script, then they can be included in the locking script. Another aspect to consider is the size of the transaction and its spending transaction. By shifting the data between the locking and unlocking script, one can shift some of the transaction fee cost between the senders of the two transactions.

Note that when we say infeasible due to circular references, the granularity is set at date fields. For example, partial locking script or even partial transaction ID (e.g., fixing the first two bytes and allow iterations through a nonce field) can be fixed in the locking script if required.

Although the focus is to construct the message m, the goal is to use m to enforce values on different fields in the current transaction. To enforce the data behind the hash values, i.e., item 9, the locking script should be designed to request the pre-image, hash them in-script, and then construct the message to be signed in-script. Taking item 9 as an example, to enforce the outputs in the current transaction, we can have

[outputsRequest]:=OP_DUP OP_HASH256 OP_ROT OP_SWAP OP_CAT <item 10 and 11> OP_CAT Input data: <item 1 to 8> <serialised outputs in current transaction>

The script segment [outputsRequest] (which may part of the "message sub-script") takes item 1 to 8 and the serialised outputs on the stack to construct item 9, and concatenate with item 10 and 11 to obtain the message m in-script. By calling [sign] <$G_x$> OP_CHECKSIGVERIFY after [outputsRequest] and passing the verification, one can be convinced that the serialised outputs left on the top of the stack is a true representation of the outputs in the current transaction.

It is also very useful to leave a copy of <item 1 to 7> on the stack for comparison. This can be achieved by modifying the script segment as below

[outputsRequest]:=OP_2DUP OP_HASH256 OP_SWAP <item 8> OP_CAT OP_SWAP OP_CAT <item 10 and 11> OP_CAT Input data: <item 1 to 7> <serialised outputs in current transaction>

After executing the modified [outputsRequest] on the input data, we can call [sign] <$G_x$> OP_CHECKSIGVERIFY to consume the message. The stack will have the current serialised outputs on the top followed by <item 1 to 7>.

It is simpler if consecutive items are grouped together as in <item 1 to 7>. They are either all in an unlocking script or all fixed in a locking script. However, a more granular approach is available at a potential cost of having a more complex script.

Note that the serialisation format for current outputs is a. value of the output 8 bytes (little endian),
b. length of the locking script,
c. the locking script, and
d. concatenate serialised outputs in order if there is more than one output.

The serialisation format for previous output (item 5 to 7) in a signed message is a. length of the locking script,
b. the locking script, and
c. value of the output 8 bytes (little endian).

In the following example, we will compare the previous output with the output in the current spending transaction and force them to be identical. The two formats will be useful for designing the locking script for the comparison.

7.3 Perpetually Enforcing Locking Script

Suppose that Alice is a root Certificate Authority (CA) and Bob is a subordinate CA. Alice is going to delegate some work to Bob which would require Bob to publish transactions on-chain as attestations to certificates. Alice does not want Bob to spend the output on anything else. Therefore, Alice is going to force all the subsequent spending transactions to have a fixed [P2PKH Bob] locking script and a fixed output value. Bob can spend the output as he can generate valid signatures, but he cannot choose any output other than sending the same amount to himself.

Alice constructs the initial transaction as shown in FIG. 6. The script segments are defined below:

[outputsRequest]:=OP_2DUP OP_HASH256 OP_SWAP <item 8> OP_CAT OP_SWAP OP_CAT <item 10 and 11> OP_CAT

[sign]:=OP_HASH256 $G_x$ OP_ADD n OP_MOD [toDER] SIGHASH_FLAG OP_SWAP OP_CAT $G_{compressed}$

[toDER]:=[toCanonical][concatenations]

[toCanonical]:=OP_DUP n/2 OP_GREATERTHAN OP_IF n OP_SWAP OP_SUB OP_ENDIF

[concatenations]:=OP_SIZE OP_DUP <0x24> OP_ADD <0x30> OP_SWAP OP_CAT <0220||$G_x$> OP_CAT OP_SWAP OP_CAT OP_SWAP OP_CAT The length of the locking script is (7+12) from +(6+32+32+33)+(6+32+32)+(11)+(15+34)+(14+20)=286=0x011e.

Note that item 8 may be 0xFFFFFFFF, item 10 may be 0x00000000 and item 11 may be 0x41000000.

To spend the transaction, Bob creates the spending transaction as shown in FIG. 7. Referring to FIG. 7, $Data_1$ in the input represents items 1 to 7 and can be written as:

010000002268f59280bdb73a24aae224a0b30c1f60b8 a386813d63214f86b98261a6b8763bb 13029ce7b1f559ef5e747fcac439f1455a2ec7c5f0 9b72290795e70665044TxID$_0$0000000001 1e{[outputsRequest] [sign] OP_CHECKSIGVERIFY OP_SWAP <0x68> OP_SPLIT OP_NIP OP_8 OP_SPLIT OP_SWAP OP_CAT OP_EQUALVERIFY OP_DUP OP_HASH160 <H(PK_B)> OP_EQUALVERIFY OP_CHECKSIG}e803000000000000

| | Items | Value |
|---|---|---|
| 1 | version | 01000000 |
| 2 | Hash of input outpoints | 2268f59280bdb73a24aae224a0b30c1f6<br>0b8a386813d63214f86b98261a6b876 |
| 3 | Hash of input sequence numbers | 3bb13029ce7b1f559ef5e747fcac439f14<br>55a2ec7c5f09b72290795e70665044 |
| 4 | Input outpoint | TxID$_0$00000000 |
| 5 | Length of previous locking script | 011e |
| 6 | Previous locking script | {[outputsRequest] [sign]<br>OP__CHECKSIGVERIFY OP__SWAP <0x68><br>OP__SPLIT OP__NIP OP__8 OP__SPLIT<br>OP__SWAP OP__CAT OP__EQUALVERIFY<br>OP__DUP OP__HASH160 <H(PK__B)><br>OP__EQUALVERIFY OP__CHECKSIG} |
| 7 | Value of previous locking script | e803000000000000 |

$Data_2$ represents the output in $TxID_1$ (value || locking script length || locking script) and can be written as:

e803000000000000011e{[outputsRequest] [sign] OP_CHECKSIGVERIFY OP_SWAP <0x68> OP_SPLIT OP_NIP OP_8 OP_SPLIT OP_SWAP OP_CAT OP_EQUALVERIFY OP_DUP OP_HASH160 <H(PK_B)> OP_EQUALVERIFY OP_CHECKSIG}

The full script to be executed during the validation of $TxID_1$ is

<Sig$_B$> <PK$_B$> <Data$_1$> <Data$_2$> [outputsRequest] [sign] OP_CHECKSIGVERIFY OP_SWAP <0x68> OP_SPLIT OP_NIP OP_8 OP_SPLIT OP_SWAP OP_CAT OP_EQUALVERIFY OP_DUP OP_HASH160 <H(PK_B)> OP_EQUALVERIFY OP_CHECKSIG After the first OP_CHECKSIGVERIFY, we will have <Sig$_B$> <PK$_B$> <Data$_1$> <Data$_2$> on the stack (rightmost on the top).

| Step | The stack | To execute |
|---|---|---|
| 1 | <Sig$_B$> <PK$_B$> <Data$_1$><br><Data$_2$> | OP_SWAP <0x68> |
| 2 | <Sig$_B$> <PK$_B$> <Data$_2$><br><Data$_1$> <0x68> | OP_SPLIT OP_NIP |
| 3 | <Sig$_B$> <PK$_B$> <Data$_2$><br><<br>011e<br>{[outputsRequest] [sign]<br>OP_CHECKSIGVERIFY OP_SWAP<br><0x68> OP_SPLIT OP_NIP OP_8<br>OP_SPLIT OP_SWAP OP_CAT<br>OP_EQUALVERIFY OP_DUP<br>OP_HASH160 <H(PK_B)><br>OP_EQUALVERIFY OP_CHECKSIG}<br>><br><e803000000000000> | OP_8 OP_SPLIT<br>OP_SWAP |
| 4 | <Sig$_B$> <PK$_B$> <Data$_2$><br><<br>011e<br>{[outputsRequest] [sign]<br>OP_CHECKSIGVERIFY OP_SWAP<br><0x68> OP_SPLIT OP_NIP OP_8<br>OP_SPLIT OP_SWAP OP_CAT<br>OP_EQUALVERIFY OP_DUP<br>OP_HASH160 <H(PK_B)><br>OP_EQUALVERIFY OP_CHECKSIG}<br>e803000000000000<br>> | OP_CAT |
| 5 | <Sig$_B$> <PK$_B$> <Data$_2$><br><<br>e803000000000000<br>011e<br>{[outputsRequest] [sign]<br>OP_CHECKSIGVERIFY OP_SWAP<br><0x68> OP_SPLIT OP_NIP OP_8<br>OP_SPLIT OP_SWAP OP_CAT<br>OP_EQUALVERIFY OP_DUP<br>OP_HASH160 <H(PK_B)><br>OP_EQUALVERIFY OP_CHECKSIG}<br>> | OP_EQUALVERIFY |
| 6 | <Sig$_B$> <PK$_B$> | OP_DUP OP_HASH160<br><H(PK_B)><br>OP EQUALVERIFY<br>OP_CHECKSIG |
| 7 | True | |

$$\text{The size of } TxID_1 \text{ is version} + \text{locktime} + \text{input} + \text{output} = 4 + 4 + (36 + 72 + 33 + 104 + 287 + 8 + 287 + 8 + 4) + (8 + 287) = 1142 \text{ bytes.}$$

Given the current setting, Bob can add his own input to cover the transaction fee. If Alice uses SIGHASH_SINGLE|ANYONECANPAY in the script segment [sign], then Bob can add another output to collect changes. This effectively makes the enforcement from Alice's locking script perpetual. One can think of this as a smart contract between Alice and Bob.

It is also possible for the locking script to take the transaction fee into consideration. After step 3, the top element on the stack is the value from the previous output. By adding <TxFee> OP_SUB before the concatenation in step 4, it allows Bob to pay the transaction fee from the previous output. This will lead to diminishing value of the output over spends, which can act as a desired feature as it sets the total number of spends Bob are entitled to.

7.4 Optimisation

As $Data_1$ contains $Data_2$, we can construct $Data_2$ from $Data_1$. In other words, we assume that the current output is identical to the previous output and use the previous output to construct the message. If it passes OP_CHECKSIG, then the two outputs must be identical. The script segment of [outputsRequest] can be re-written as

[outputsRequest]:=OP_2DUP OP_CAT OP_TOALTSTACK OP_SWAP OP_CAT OP_HASH256 <item 8> OP_SWAP OP_CAT OP_FROMALTSTACK OP_SWAP OP_CAT OP_CAT <item 10 and 11> OP_CAT Input data: <item 1 to 4> <item 5 and 6> <item 7>

With this new [outputsRequest], we can update the locking script in $TxID_0$ and $TxID_1$ as [outputsRequest][sign] OP_CHECKSIGVERIFY OP_DUP OP_HASH160 <H(PK_B)> OP_EQUALVERIFY OP_CHECKSIG and the unlocking script as <$Sig_B$> <$PK_B$> <$Data_1$> <$Data_2$> <$Data_3$>, where $Data_1$ is item 1 to 4:

010000002268f59280bdb73a24aae224a0b30c1f60b8a 386813d63214f86b98261a6b8763bb 13029ce7b1f559ef5e747fcac439f1455a2ec7c5f09 b72290795e70665044$TxID_0$00000000

$Data_2$ is item 5 and 6:

011b{[outputsRequest] [sign] OP_CHECKSIGVERIFY OP_SWAP <0x68> OP_SPLIT OP_NIP OP_8 OP_SPLIT OP_SWAP OP_CAT OP_EQUALVERIFY OP_DUP OP_HASH160 <H(PK_B)> OP_EQUALVERIFY OP_CHECKSIG}

$Data_3$ is item 7: e803000000000000.

The size of $TxID_1$ is 941 bytes. A step-by-step execution is given below, where Step 1 to 5 is from [outputsRequest].

| Step | The stacks | To execute |
|---|---|---|
| 1 | <$Sig_B$> <$PK_B$> <$Data_1$> <$Data_2$> <$Data_3$> | OP_2DUP OP_CAT OP_TOALTSTACK |
| 2 | <$Sig_B$> <$PK_B$> <$Data_1$> <$Data_2$> <$Data_3$> ALTSTACK: <item 5 to 7> | OP_SWAP OP_CAT OP_HASH256 |
| 3 | <$Sig_B$> <$PK_B$> <$Data_1$> <item 9> ALTSTACK: <item 5 to 7> | <item 8> OP_SWAP OP_CAT |
| 4 | <$Sig_B$> <$PK_B$> <$Data_1$> <item 8 and 9> ALTSTACK: <item 5 to 7> | OP_FROMALTSTACK OP_SWAP OP_CAT |
| 5 | <$Sig_B$> <$PK_B$> <$Data_1$> <item 5 to 9> | OP_CAT <item 10 and 11> OP_CAT |
| 6 | <$Sig_B$> <$PK_B$> <item 1 to 11> | [sign] OP_CHECKSIGVERIFY |
| 7 | <$Sig_B$> <$PK_B$> | OP_DUP OP_HASH160 <H(PK_B)> OP_EQUALVERIFY OP_CHECKSIG |
| 8 | True | |

Further improvement can be made by using the alt stack for storing $G_x$ and n. Each of them is of size 32 bytes. As $G_{compress}$ is $G_x$ and n/2 can be derived from n, we can use several opcodes to reference them from the alt stack.

Before:

[sign]:=OP_HASH256 $G_x$ OP_ADD n OP_MOD [toDER] SIGHASH_FLAG OP_SWAP OP_CAT $G_x$

[toDER]:=[toCanonical][concatenations]

[toCanonical]:=OP_DUP n/2 OP_GREATERTHAN OP_IF n OP_SWAP OP_SUB OP_ENDIF

[concatenations]:=OP_SIZE OP_DUP <0x24> OP_ADD <0x30> OP_SWAP OP_CAT <0220||G_x> OP_CAT OP_SWAP OP_CAT OP_SWAP OP_CAT After:

[sign]:=OP_HASH256 $G_x$ OP_DUP OP_TOALTSTACK OP_ADD n OP_DUP OP_TOALTSTACK OP_MOD [toDER] SIGHASH_FLAG OP_SWAP OP_CAT OP_FROMALTSTACK

[toDER]:=[toCanonical][concatenations]

[toCanonical]:=OP_DUP OP_FROMALTSTACK OP_DUP OP_TOALTSTACK OP_2 OP_DIV OP_GREATERTHAN OP_IF OP_FROMALTSTACK OP_SWAP OP_SUB OP_ENDIF

[concatenations]:=OP_SIZE OP_DUP <0x24> OP_ADD <0x30> OP_SWAP OP_CAT <0220> OP_FROMALTSTACK OP_DUP OP_TOALTSTACK OP_CAT OP_CAT OP_SWAP OP_CAT OP_SWAP OP_CAT We added 15 opcodes and removed two instances of $G_x$ and two instances of n. The total saving is $(32\times2+32\times2)-15=113$ bytes. Therefore, the size of the spending transaction $TxID_1$ can be further reduced to 828 bytes.

FIG. 8 illustrates an optimised version of the spending transaction.

8. Security Analysis

Assertion 1: If (r,s) is a valid signature with respect to a public key P on both messages m and m', then m=m'.

Proof: let z=hash(m) and z'=hash(m').

Let $u=zs^{-1} \bmod n$, $u'=z's^{-1} \bmod n$, and $v=rs^{-1} \bmod n$.

So, we have $[uG+vP]_x=[u'G+vP]_x=r \bmod n$.

$uG=u'G$ $u=u' \bmod n$ $z=z' \bmod n$ $m=m'$.

Assertion 2: Public key P must be fixed in the locking script.

Reasoning:

Suppose P is not fixed and (r,s) is a valid signature with respect to P on m.

Let $z'=\text{hash}(m')\cdot u'=z's^{-1}$, and $v=rs^{-1}$

We want to find P' such that $u'G+vP'=R$ $$P'=v^{-1}(R-u'G)$$

Now (r,s) is valid with respect to P' on m'.

Therefore P must be fixed in the locking script.

Assertion 3: k should be fixed in the locking script.

Reasoning:

Suppose (r,s) is a valid signature generated in the locking script with respect to P on m. Suppose k is not fixed in the locking script and is provided in the unlocking script.

Then an adversary can:

1. intercept the spending transaction, and
2. replace k with k' in the unlocking script.

Then (r',s') generated in the locking script will be a valid signature with respect to P on m. Transaction will still be valid, but the transaction ID is changed.

Assertion 4: Sighash flag should be fixed in the locking script.

Reasoning:

Suppose (r,s) is a valid signature generated in the locking script with respect to P on m. Suppose sighash flag is not fixed in the locking script and is provided in the unlocking script.

1. Intercept the spending transaction
2. Change the sighash flag
3. Update the message m accordingly to m'.

In some use case, this would invalidate the transaction. E.g., the locking script expects multiple inputs and outputs with sighash flag "ALL"; changing the flag to anything else would invalidate the script execution.

In others, this would change the transaction ID without invalidating the transaction. E.g., the locking script only enforces conditions on the outputs of its spending transaction; adding or removing "ANYONECANPAY" would not invalidate the transaction, but will change the transaction ID.

9. Example Scripts

Tests have shown that it is possible to achieve a spending transaction of size 1415 bytes. The overhead mainly arises from reversing endianness. A 32-byte string would require 124 bytes of opcodes to reverse its endianness and in some examples it is necessary to reverse endianness of two strings in the locking script. The locking script appears both in the unlocking script and the output. Therefore, the total overhead from endianness in our implementation is over 500 bytes. We did not use Alt Stack to store $G_x$ and n in our current implementation for simplicity. This would save us 200 bytes in total.

9.1 Locking Script 1 (LS1)—generateSig and checkSig
"aa517f517f517f517f517f517f517f517f517f517f517f517f51
7f517f517f517f517f517f517f517f517f517f517f517f517f517
f517f517f517f517f517f517f517f7c7e7c7e7c7e7c7e7c7e
7c7e7c7e7c7e7c7e7c7e7c7e7c7e7c7e7c7e7c7e7c7e7c7e7c7e
7c7e7c7e7c7e7c7e7c7e7c7e7c7e7c7e7c7e7c7e7c7e7c7e
7c7e7c7e7c7e01007e81209817f8165b81f259d928ce2dd
bfc9b02070b87ce9562a055acbbdc
f97e66be799321414136d08c5ed2bf3ba048afe6dcaebaf
effffffffffffffffffffffffffffff00977621414136d08c5ed2bf3b
a048afe6dcaebafeffffffffffffffffffffffffffffff005296a063214
14136d08c5ed
2bf3ba048afe6dcaebafeffffffffffffffffffffffffffffff007c9
46882766b6b517f517f517f517f517f517f517f517f517
f517f517f517f517f517f517f517f517f517f517f517f517f
517f517f517f517f517f
517f517f517f517f517f6c0120a063517f687c7e7c7e7c7e
7c7e7c7e7c7e7c7e7c7e7c7e7c7e7c
7e7c7e7c7e7c7e7c7e7c7e7c7e7c7e7c7e7c7e7c7e7c7e7c7e7c
7e7c7e7c7e7c7e7c7e7c7e7c7e7c7e7c7e6c0120a0637c7e
68827601249301307c7e23022079be667ef9dcbbac55a0
6295ce870b
07029bfcdb2dce28d959f2815b16f81798027e7c7e7c7e0
1417e210279be667ef9dcbbac55a06295ce870b07029bf
cdb2dce28d959f2815b16f81798ac"

Input: serialised transaction message for signing as shown in the table in section 6.

The locking script takes the message m, and 1. double SHA256 on m to obtain z,
2. reverse endianness of z,
3. add 0x00 to ensure z is not interpreted as a negative number,
4. call OP_BIN2NUM to have minimal encoding on z (would take care the case when step 3 introduces redundancy),
5. compute $s=z+G_x \bmod n$,
6. convert s to n−s if s>n/2,
7. obtain length of s,
8. reverse endianness of s (32 bytes),
9. reverse one more byte if the length of s is greater than 32,
10. compute the total length of a DER signature (0x24+ length of s),
11. add DER prefix 0x30,
12. concatenate $r=G_x$,
13. concatenate s,
14. concatenate sighash flag "ALL",
15. push compressed public key $G_x$, and
16. call OP_CHECKSIG.

9.2 Locking Script 2 (LS2)—constructMsg +LS1 +P2PKH
"6e810200029458807c7eaa04ffffffff7c7e7e7e7e08000
00000410000007eaa517f517f517f51
7f517f517f517f517f517f517f517f517f517f517f517f51
7f517f517f517f517f517f517f517f517f517f
517f517f517f517f517f517f517f7c7e7c7e7c7e7c7e
7c7e7c7e7c7e7c7e7c7e7c7e7c7e7c7e7c7e7c7e7c7e7c7e7c7
e7c7e7c7e7c7e7c7e7c7e7c7e7c7e7c7e7c7e7c7e7c7e7c7e7c
7e7c7e7c7e7c7e7c7e7c7e0100
7e81209817f8165b81f259d928ce2ddbfc9b0207
0b87ce9562a055acbbdcf97e66be799321414316
d08c5ed2bf3ba048afe6dcaebafeffffffffffffffffffffffff
ffffff00977621414136d08c5ed2bf3b
a048afe6dcaebafeffffffffffffffffffffffffffffff005296a
06321414136d08c5ed2bf3ba048afe6dcae
bafeffffffffffffffffffffffffffffff007c946882766b6b
517f517f517f517f517f517f517f517f517f517f
517f517f517f517f517f517f517f517f517f517f5
17f517f517f517f517f517f517f517f517f517f51
7f6c0120a063517f687c7e7c7e7c7e7c7e7c7e7c7e7
c7e7c7e7c7e7c7e7c7e7c7e7c7e7c7e7c7e7c7e7c7e
7c7e7c7e7c7e7c7e7c7e7c7e7c7e7c7e7c7e7c7e7c7e7c
7e7c7e7c7e7c7e6c0120a0637c
7e68827601249301307c7e23022079be667ef9dcb
bac55a06295ce870b07029bfcdb2dce28d
959f2815b16f81798027e7c7e7c7e01417e21027
9be667ef9dcbbac55a06295ce870b07029bf
cdb2dce28d959f2815b16f81798ad76a914751e76
e8199196d454941c45d1b3a323f1433bd6 88ac"

Input: <Sig> <PK> <Item 1 to 4> <Item 5 and 6> <Item 7>

The locking script takes a pair of signature and public key, and item 1 to 7 as in the table in section 6 in three PUSHDATA operations, and 1. take the previous value and work out the new output value (subtracting a fixed transaction fee),
2. take the previous locking script as the new locking script for the new output,
3. concatenate the new output value and new locking script to obtain the new output,
4. double SHA256 the new output to obtain the hash of outputs (item 9),
5. push sequence number (item 8),
6. concatenate to get message string (item 1 to 9),
7. push locktime and sigahash flag (item 10 and 11),
8. concatenate to obtain the message to be signed m,
9. call LS1 with OP_CHECKSIGVERIFY, and
10. call P2PKH to check Sig with respect to PK.

9.3 Transaction 0-genesis transaction
{
"txid": "88b9d41101a4c064b283f80ca73837d96f974bc3fbe931b35db7bca8370cca34",
"hash": "88b9d41101a4c064b283f80ca73837d96f974bc3fbe931b35db7bca8370cca34",
"version": 1, -continued "size": 730,
"locktime": 0,
"vin": [
{
"txid": "52685bdbaae5c76887c23cee699bc48f293192a313c19b9fad4c77b993655df5",
"vout": 0,
"scriptSig": {
"asm":
"3044022079be667ef9dcbbac55a06295ce870b07029bfcdb2dce28d959f2815b16f81798022
01229c3605c61c4133b282cc30ece9e7d5c3693bf2cd1c03a3caadcd9f25900a5[ALL|FORKID]
0279be667ef9dcbbac55a06295ce870b07029bfcdb2dce28d959f2815b16f81798",
"hex":
"473044022079be667ef9dcbbac55a06295ce870b07029bfcdb2dce28d959f2815b16f817980
2201229c3605c61c4133b282cc30ece9e7d5c3693bf2cd1c03a3caadcd9f25900a541210279b
e667ef9dcbbac55a06295ce870b07029bfcdb2dce28d959f2815b16f81798"
},
"sequence": 4294967295
}
],
"vout": [
{
"value": 49.99999388,
"n": 0,
"scriptPubKey": {
"asm": "OP_2DUP OP_BIN2NUM 512 OP_SUB 8 OP_NUM2BIN OP_SWAP OP_CAT
OP_HASH256 -2147483647 OP_SWAP OP_CAT OP_CAT OP_CAT OP_CAT
0000000041000000 OP_CAT OP_HASH256 1 OP_SPLIT 1 OP_SPLIT 1 OP_SPLIT 1 OP_SPLIT 1
OP_SPLIT 1 OP_SPLIT 1 OP_SPLIT 1 OP_SPLIT 1 OP_SPLIT 1 OP_SPLIT 1 OP_SPLIT 1 OP_SPLIT
1 OP_SPLIT 1 OP_SPLIT 1 OP_SPLIT 1 OP_SPLIT 1 OP_SPLIT 1 OP_SPLIT 1 OP_SPLIT 1
OP_SPLIT 1 OP_SPLIT 1 OP_SPLIT 1 OP_SPLIT 1 OP_SPLIT 1 OP_SPLIT 1 OP_SPLIT 1 OP_SPLIT
1 OP_SPLIT 1 OP_SPLIT 1 OP_SPLIT 1 OP_SPLIT OP_SWAP OP_CAT OP_SWAP OP_CAT
OP_SWAP OP_CAT OP_SWAP OP_CAT OP_SWAP OP_CAT OP_SWAP OP_CAT OP_SWAP
OP_CAT OP_SWAP OP_CAT OP_SWAP OP_CAT OP_SWAP OP_CAT OP_SWAP OP_CAT
OP_SWAP OP_CAT OP_SWAP OP_CAT OP_SWAP OP_CAT OP_SWAP OP_CAT OP_SWAP
OP_CAT OP_SWAP OP_CAT OP_SWAP OP_CAT OP_SWAP OP_CAT OP_SWAP OP_CAT
OP_SWAP OP_CAT OP_SWAP OP_CAT OP_SWAP OP_CAT OP_SWAP OP_CAT OP_SWAP
OP_CAT OP_SWAP OP_CAT OP_SWAP OP_CAT OP_SWAP OP_CAT OP_SWAP OP_CAT
OP_SWAP OP_CAT OP_SWAP OP_CAT 0 OP_CAT OP_BIN2NUM
9817f8165b81f259d928ce2ddbfc9b02070b87ce9562a055acbbdcf97e66be79 OP_ADD
414136d08c5ed2bf3ba048afe6dcaebafeffffffffffffffffffffffffffffff00 OP_MOD OP_DUP
414136d08c5ed2bf3ba048afe6dcaebafeffffffffffffffffffffffffffffff00 2 OP_DIV
OP_GREATERTHAN OP_IF 414136d08c5ed2bf3ba048afe6dcaebafeffffffffffffffffffffffffffffff00
OP_SWAP OP_SUB OP_ENDIF OP_SIZE OP_DUP OP_TOALTSTACK OP_TOALTSTACK 1
OP_SPLIT 1 OP_SPLIT 1 OP_SPLIT 1 OP_SPLIT 1 OP_SPLIT 1 OP_SPLIT 1 OP_SPLIT 1 OP_SPLIT
1 OP_SPLIT 1 OP_SPLIT 1 OP_SPLIT 1 OP_SPLIT 1 OP_SPLIT 1 OP_SPLIT 1 OP_SPLIT 1
OP_SPLIT 1 OP_SPLIT 1 OP_SPLIT 1 OP_SPLIT 1 OP_SPLIT 1 OP_SPLIT 1 OP_SPLIT 1 OP_SPLIT
1 OP_SPLIT 1 OP_SPLIT 1 OP_SPLIT 1 OP_SPLIT 1 OP_SPLIT 1 OP_SPLIT 1 OP_SPLIT 1
OP_SPLIT OP_FROMALTSTACK 32 OP_GREATERTHAN OP_IF 1 OP_SPLIT OP_ENDIF
OP_SWAP OP_CAT OP_SWAP OP_CAT OP_SWAP OP_CAT OP_SWAP OP_CAT OP_SWAP
OP_CAT OP_SWAP OP_CAT OP_SWAP OP_CAT OP_SWAP OP_CAT OP_SWAP OP_CAT
OP_SWAP OP_CAT OP_SWAP OP_CAT OP_SWAP OP_CAT OP_SWAP OP_CAT OP_SWAP
OP_CAT OP_SWAP OP_CAT OP_SWAP OP_CAT OP_SWAP OP_CAT OP_SWAP OP_CAT
OP_SWAP OP_CAT OP_SWAP OP_CAT OP_SWAP OP_CAT OP_SWAP OP_CAT OP_SWAP
OP_CAT OP_SWAP OP_CAT OP_SWAP OP_CAT OP_SWAP OP_CAT OP_SWAP OP_CAT
OP_SWAP OP_CAT OP_SWAP OP_CAT OP_SWAP OP_CAT OP_SWAP OP_CAT
OP_FROMALTSTACK 32 OP_GREATERTHAN OP_IF OP_SWAP OP_CAT OP_ENDIF OP_SIZE
OP_DUP 36 OP_ADD 48 OP_SWAP OP_CAT
022079be667ef9dcbbac55a06295ce870b07029bfcdb2dce28d959f2815b16f8179802
OP_CAT OP_SWAP OP_CAT OP_SWAP OP_CAT 65 OP_CAT
0279be667ef9dcbbac55a06295ce870b07029bfcdb2dce28d959f2815b16f81798
OP_CHECKSIGVERIFY OP_DUP OP_HASH160
751e76e8199196d454941c45d1b3a323f1433bd6 OP_EQUALVERIFY OP_CHECKSIG",
"hex":
"6e810200029458807c7eaa04ffffffff7c7e7e7e7e0800000000410000007eaa517f517f517f51
7f517f517f517f517f517f517f517f517f517f517f517f517f517f517f517f517f517f517f517f517f
517f517f517f517f517f517f517f7c7e7c7e7c7e7c7e7c7e7c7e7c7e7c7e7c7e7c7e7c7e7c7e7c7e7c7
e7c7e7c7e7c7e7c7e7c7e7c7e7c7e7c7e7c7e7c7e7c7e7c7e7c7e7c7e7c7e7c7e7c7e7c7e7c7e0100
7e81209817f8165b81f259d928ce2ddbfc9b02070b87ce9562a055acbbdcf97e66be79932141
4136d08c5ed2bf3ba048afe6dcaebafeffffffffffffffffffffffffffffff00977621414136d08c5ed2bf3b
a048afe6dcaebafeffffffffffffffffffffffffffffff005296a06321414136d08c5ed2bf3ba048afe6dcae
bafeffffffffffffffffffffffffffffff007c946882766b6b517f517f517f517f517f517f517f517f517f517f
517f517f517f517f517f517f517f517f517f517f517f517f517f517f517f517f517f517f517f517f51

-continued

7f6c0120a063517f687c7e7c7e7c7e7c7e7c7e7c7e7c7e7c7e7c7e7c7e7c7e7c7e7c7e7c7e7c7e7c7
e7c7e7c7e7c7e7c7e7c7e7c7e7c7e7c7e7c7e7c7e7c7e7c7e7c7e7c7e7c7e7c7e6c0120a0637c
7e68827601249301307c7e23022079be667ef9dcbbac55a06295ce870b07029bfcdb2dce28d
959f2815b16f81798027e7c7e7c7e01417e210279be667ef9dcbbac55a06295ce870b07029bf
cdb2dce28d959f2815b16f81798ad76a914751e76e8199196d454941c45d1b3a323f1433bd6
88ac",
"type": "nonstandard"
}
}
],
"hex":
"0100000001f55d6593b9774cad9f9bc113a39231298fc49b69ee3cc28768c7e5aadb5b68520
00000006a473044022079be667ef9dcbbac55a06295ce870b07029bfcdb2dce28d959f2815b1
6f8179802201229c3605c61c4133b282cc30ece9e7d5c3693bf2cd1c03a3caadcd9f25900a541
210279be667ef9dcbbac55a06295ce870b07029bfcdb2dce28d959f2815b16f81798ffffffff019
cef052a01000000fd32026e810200029458807c7eaa04ffffffff7c7e7e7e7e080000000041000
0007eaa517f517f517f517f517f517f517f517f517f517f517f517f517f517f517f517f517f51
7f517f517f517f517f517f517f517f517f517f517f517f517f517f7c7e7c7e7c7e7c7e7c7e7c7e7c
7e7c7e7c7e7c7e7c7e7c7e7c7e7c7e7c7e7c7e7c7e7c7e7c7e7c7e7c7e7c7e7c7e7c7e7c7e7c7
e7c7e7c7e7c7e7c7e7c7e01007e81209817f8165b81f259d928ce2ddbfc9b02070b87ce9562a055a
cbbdcf97e66be799321414136d08c5ed2bf3ba048afe6dcaebafeffffffffffffffffffffffffffffff00977
621414136d08c5ed2bf3ba048afe6dcaebafeffffffffffffffffffffffffffffff005296a06321414136d0
8c5ed2bf3ba048afe6dcaebafeffffffffffffffffffffffffffffff007c946882766b6b517f517f517f517f5
17f517f517f517f517f517f517f517f517f517f517f517f517f517f517f517f517f517f517f517
f517f517f517f517f517f517f517f6c0120a063517f687c7e7c7e7c7e7c7e7c7e7c7e7c7e7c7e7c
7e7c7e7c7e7c7e7c7e7c7e7c7e7c7e7c7e7c7e7c7e7c7e7c7e7c7e7c7e7c7e7c7e7c7e7c7e7c7
e7c7e7c7e6c0120a0637c7e68827601249301307c7e23022079be667ef9dcbbac55a06295ce8
70b07029bfcdb2dce28d959f2815b16f81798027e7c7e7c7e01417e210279be667ef9dcbbac5
5a06295ce870b07029bfcdb2dce28d959f2815b16f81798ad76a914751e76e8199196d45494
1c45d1b3a323f1433bd688ac00000000"
}
9.4 Transaction 1 - spending transaction
{
"txid": "c700e1d6c995e4c77014536d4431be84d7fb40d3fbef52ed85be2ad06414eac8",
"hash": "c700e1d6c995e4c77014536d4431be84d7fb40d3fbef52ed85be2ad06414eac8",
"version": 1,
"size": 1415,
"locktime": 0,
"vin": [
{
"txid": "88b9d41101a4c064b283f80ca73837d96f974bc3fbe931b35db7bca8370cca34",
"vout": 0,
"scriptSig": {
"asm":
"3044022079be667ef9dcbbac55a06295ce870b07029bfcdb2dce28d959f2815b16f81798022
0388bd5f619c02287145cf0bb3bc440f883b09e35e67a4adcf50635800219ed34[ALL|FORKID]
0279be667ef9dcbbac55a06295ce870b07029bfcdb2dce28d959f2815b16f81798
01000000fb472de1f838d9560dc7b19b1ab62b0c6ed60580779017d3cd32d22bcc051ce13bb
13029ce7b1f559ef5e747fcac439f1455a2ec7c5f09b72290795e7066504434ca0c37a8bcb75d
b331e9fbc34b976fd93738a70cf883b264c0a40111d4b98800000000
fd32026e810200029458807c7eaa04ffffffff7c7e7e7e7e080000000041000000 7eaa517f517f5
17f517f517f517f517f517f517f517f517f517f517f517f517f517f517f517f517f517f517f517
f517f517f517f517f517f517f517f517f7c7e7c7e7c7e7c7e7c7e7c7e7c7e7c7e7c7e7c7e7c7e7c
7e7c7e7c7e7c7e7c7e7c7e7c7e7c7e7c7e7c7e7c7e7c7e7c7e7c7e7c7e7c7e7c7e7c7e7c7e7c7
e01007e81209817f8165b81f259d928ce2ddbfc9b02070b87ce9562a055acbbdcf97e66be799
321414136d08c5ed2bf3ba048afe6dcaebafeffffffffffffffffffffffffffffff00977621414136d08c5e
d2bf3ba048afe6dcaebafeffffffffffffffffffffffffffffff005296a06321414136d08c5ed2bf3ba048af
e6dcaebafeffffffffffffffffffffffffffffff007c946882766b6b517f517f517f517f517f517f517f51
7f517f517f517f517f517f517f517f517f517f517f517f517f517f517f517f517f517f517f517f
517f517f6c0120a063517f687c7e7c7e7c7e7c7e7c7e7c7e7c7e7c7e7c7e7c7e7c7e7c7e7c7e7c7e7c
7e7c7e7c7e7c7e7c7e7c7e7c7e7c7e7c7e7c7e7c7e7c7e7c7e7c7e7c7e7c7e7c7e7c7e6c0120a
0637c7e68827601249301307c7e23022079be667ef9dcbbac55a06295ce870b07029bfcdb2dc
e28d959f2815b16f81798027e7c7e7c7e01417e210279be667ef9dcbbac55a06295ce870b070
29bfcdb2dce28d959f2815b16f81798ad76a914751e76e8199196d454941c45d1b3a323f1433
bd688ac9cef052a01000000",
"hex":
"473044022079be667ef9dcbbac55a06295ce870b07029bfcdb2dce28d959f2815b16f817980
220388bd5f619c02287145cf0bb3bc440f883b09e35e67a4adcf50635800219ed3441210279b
e667ef9dcbbac55a06295ce870b07029bfcdb2dce28d959f2815b16f817984c6801000000fb4
72de1f838d9560dc7b19b1ab62b0c6ed60580779017d3cd32d22bcc051ce13bb13029ce7b1f
559ef5e747fcac439f1455a2ec7c5f09b72290795e7066504434ca0c37a8bcb75db331e9fbc34
b976fd93738a70cf883b264c0a40111d4b988000000004d3502fd32026e810200029458807c
7eaa04ffffffff7c7e7e7e7e080000000041000000 7eaa517f517f517f517f517f517f517f517f517
f517f517f517f517f517f517f517f517f517f517f517f517f517f517f517f517f517f517f517f5
17f517f7c7e7c7e7c7e7c7e7c7e7c7e7c7e7c7e7c7e7c7e7c7e7c7e7c7e7c7e7c7e7c7e7c7e7c7
e7c7e7c7e7c7e7c7e7c7e7c7e7c7e7c7e7c7e7c7e7c7e7c7e7c7e01007e81209817f8165b81f2
59d928ce2ddbfc9b02070b87ce9562a055acbbdcf97e66be799321414136d08c5ed2bf3ba048
afe6dcaebafefffffff fffffffffffffffffffffff00977621414136d08c5ed2bf3ba048afe6dcaebafefffffff
fffffffffffffffffffffff005296a06321414136d08c5ed2bf3ba048afe6dcaebafeffffffffffffffffffff -continued fff007c946882766b6b517f517f517f517f517f517f517f517f517f517f517f517f517f517f517f517f517f51
7f517f517f517f517f517f517f517f517f517f517f517f517f517f517f517f517f517f517f6c0120a063517f687c7
e7c7e7c7e7c7e7c7e7c7e7c7e7c7e7c7e7c7e7c7e7c7e7c7e7c7e7c7e7c7e7c7e7c7e7c7e7c7e7c7e7c7e7c7e7c7e7c7e
7c7e7c7e7c7e7c7e7c7e7c7e7c7e7c7e7c7e7c7e7c7e7c7e7c7e7c7e7c7e7c7e6c0120a0637c7e68827601249301307c
7e23022079be667ef9dcbbac55a06295ce870b07029bfcdb2dce28d959f2815b16f81798027e
7c7e7c7e01417e210279be667ef9dcbbac55a06295ce870b07029bfcdb2dce28d959f2815b16
f81798ad76a914751e76e8199196d454941c45d1b3a323f1433bd688ac089cef052a01000000
"
},
"sequence": 4294967295
}
],
"vout": [
{
"value": 49.99998876,
"n": 0,
"scriptPubKey": {
"asm": "OP_2DUP OP_BIN2NUM 512 OP_SUB 8 OP_NUM2BIN OP_SWAP OP_CAT OP_HASH256 -2147483647 OP_SWAP OP_CAT OP_CAT OP_CAT OP_CAT 0000000041000000 OP_CAT OP_HASH256 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT 0 OP_CAT OP_BIN2NUM 9817f8165b81f259d928ce2ddbfc9b02070b87ce9562a055acbbdcf97e66be79 OP_ADD 414136d08c5ed2bf3ba048afe6dcaebafeffffffffffffffffffffffffffffff00 OP_MOD OP_DUP 414136d08c5ed2bf3ba048afe6dcaebafeffffffffffffffffffffffffffffff00 2 OP_DIV OP_GREATERTHAN OP_IF 414136d08c5ed2bf3ba048afe6dcaebafeffffffffffffffffffffffffffffff00 OP_SWAP OP_SUB OP_ENDIF OP_SIZE OP_DUP OP_TOALTSTACK OP_TOALTSTACK 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT 1 OP_SPLIT OP_FROMALTSTACK 32 OP_GREATERTHAN OP_IF 1 OP_SPLIT OP_ENDIF OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_SWAP OP_CAT OP_FROMALTSTACK 32 OP_GREATERTHAN OP_IF OP_SWAP OP_CAT OP_ENDIF OP_SIZE OP_DUP 36 OP_ADD 48 OP_SWAP OP_CAT 022079be667ef9dcbbac55a06295ce870b07029bfcdb2dce28d959f2815b16f8179802 OP_CAT OP_SWAP OP_CAT OP_SWAP OP_CAT 65 OP_CAT 0279be667ef9dcbbac55a06295ce870b07029bfcdb2dce28d959f2815b16f81798 OP_CHECKSIGVERIFY OP_DUP OP_HASH160 751e76e8199196d454941c45d1b3a323f1433bd6 OP_EQUALVERIFY OP_CHECKSIG",
"hex":
"6e810200029458807c7eaa04ffffffff7c7e7e7e7e0800000000410000007eaa517f517f517f51
7f517f517f517f517f517f517f517f517f517f517f517f517f517f517f517f517f517f517f517f517f517f517f517f
517f517f517f517f517f517f517f7c7e7c7e7c7e7c7e7c7e7c7e7c7e7c7e7c7e7c7e7c7e7c7e7c7e7c7e7c7e7c7e7c7
e7c7e7c7e7c7e7c7e7c7e7c7e7c7e7c7e7c7e7c7e7c7e7c7e7c7e7c7e7c7e7c7e7c7e7c7e7c7e7c7e7c7e7c7e0100
7e81209817f8165b81f259d928ce2ddbfc9b02070b87ce9562a055acbbdcf97e66be79932141
4136d08c5ed2bf3ba048afe6dcaebafeffffffffffffffffffffffffffffff00977621414136d08c5ed2bf3b
a048afe6dcaebafeffffffffffffffffffffffffffffff005296a06321414136d08c5ed2bf3ba048afe6dcae
bafeffffffffffffffffffffffffffffff007c946882766b6b517f517f517f517f517f517f517f517f517f517f
517f517f517f517f517f517f517f517f517f517f517f517f517f517f517f517f517f517f517f517f517f517f517f51
7f6c0120a063517f687c7e7c7e7c7e7c7e7c7e7c7e7c7e7c7e7c7e7c7e7c7e7c7e7c7e7c7e7c7e7c7e7c7e7c7e7c7
e7c7e7c7e7c7e7c7e7c7e7c7e7c7e7c7e7c7e7c7e7c7e7c7e7c7e7c7e7c7e7c7e7c7e7c7e7c7e7c7e6c0120a0637c
7e68827601249301307c7e23022079be667ef9dcbbac55a06295ce870b07029bfcdb2dce28d
959f2815b16f81798027e7c7e7c7e01417e210279be667ef9dcbbac55a06295ce870b07029bf
cdb2dce28d959f2815b16f81798ad76a914751e76e8199196d454941c45d1b3a323f1433bd6
88ac",
"type": "nonstandard"
}
}
],
"hex":
"010000000134ca0c37a8bcb75db331e9fbc34b976fd93738a70cf883b264c0a40111d4b9880
0000000fd1503473044022079be667ef9dcbbac55a06295ce870b07029bfcdb2dce28d959f28
15b16f817980220388bd5f619c02287145cf0bb3bc440f883b09e35e67a4adcf50635800219e -continued d3441210279be667ef9dcbbac55a06295ce870b07029bfcdb2dce28d959f2815b16f817984c6
801000000fb472de1f838d9560dc7b19b1ab62b0c6ed60580779017d3cd32d22bcc051ce13b
b13029ce7b1f559ef5e747fcac439f1455a2ec7c5f09b72290795e7066504434ca0c37a8bcb75
db331e9fbc34b976fd93738a70cf883b264c0a40111d4b988000000004d3502fd32026e81020
0029458807c7eaa04ffffffff7c7e7e7e7e0800000000410000007eaa517f517f517f517f517f517
f517f517f517f517f517f517f517f517f517f517f517f517f517f517f517f517f517f517f517f517f5
17f517f517f517f517f7c7e7c7e7c7e7c7e7c7e7c7e7c7e7c7e7c7e7c7e7c7e7c7e7c7e7c7e7c7e7c7
e7c7e7c7e7c7e7c7e7c7e7c7e7c7e7c7e7c7e7c7e7c7e7c7e7c7e7c7e7c7e7c7e01007e812098
17f8165b81f259d928ce2ddbfc9b02070b87ce9562a055acbbdcf97e66be799321414136d08c
5ed2bf3ba048afe6dcaebafeffffffffffffffffffffffffffffff00977621414136d08c5ed2bf3ba048afe6
dcaebafeffffffffffffffffffffffffffffff005296a06321414136d08c5ed2bf3ba048afe6dcaebafeffffffff
ffffffffffffffffffff007c946882766b6b517f517f517f517f517f517f517f517f517f517f517f517f5
17f517f517f517f517f517f517f517f517f517f517f517f517f517f517f517f517f517f517f517f6c0120
a063517f687c7e7c7e7c7e7c7e7c7e7c7e7c7e7c7e7c7e7c7e7c7e7c7e7c7e7c7e7c7e7c7e7c7e7c7
e7c7e7c7e7c7e7c7e7c7e7c7e7c7e7c7e7c7e7c7e7c7e7c7e7c7e7c7e7c7e6c0120a0637c7e688276
01249301307c7e23022079be667ef9dcbbac55a06295ce870b07029bfcdb2dce28d959f2815b
16f81798027e7c7e7c7e01417e210279be667ef9dcbbac55a06295ce870b07029bfcdb2dce28
d959f2815b16f81798ad76a914751e76e8199196d454941c45d1b3a323f1433bd688ac089cef
052a01000000ffffffff019ced052a01000000fd32026e810200029458807c7eaa04ffffffff7c7e7
e7e7e0800000000410000007eaa517f517f517f517f517f517f517f517f517f517f517f517f517f
517f517f517f517f517f517f517f517f517f517f517f517f517f517f517f517f517f517f517f7c7e7c7e7
c7e7c7e7c7e7c7e7c7e7c7e7c7e7c7e7c7e7c7e7c7e7c7e7c7e7c7e7c7e7c7e7c7e7c7e7c7e7c7e7c
7e7c7e7c7e7c7e7c7e7c7e7c7e7c7e7c7e7c7e01007e81209817f8165b81f259d928ce2ddbfc9
b02070b87ce9562a055acbbdcf97e66be799321414136d08c5ed2bf3ba048afe6dcaebafeffffff
ffffffffffffffffffffff00977621414136d08c5ed2bf3ba048afe6dcaebafeffffffffffffffffffffffffffffff0
05296a06321414136d08c5ed2bf3ba048afe6dcaebafeffffffffffffffff007c94688276
6b6b517f517f517f517f517f517f517f517f517f517f517f517f517f517f517f517f517f517f517f517f5
17f517f517f517f517f517f517f517f517f517f517f517f6c0120a063517f687c7e7c7e7c7e7c7e7
c7e7c7e7c7e7c7e7c7e7c7e7c7e7c7e7c7e7c7e7c7e7c7e7c7e7c7e7c7e7c7e7c7e7c7e7c7e7c7e7c
7e7c7e7c7e7c7e7c7e7c7e7c7e7c7e6c0120a0637c7e68827601249301307c7e23022079be66
7ef9dcbbac55a06295ce870b07029bfcdb2dce28d959f2815b16f81798027e7c7e7c7e01417e
210279be667ef9dcbbac55a06295ce870b07029bfcdb2dce28d959f2815b16f81798ad76a914
751e76e8199196d454941c45d1b3a323f1433bd688ac00000000"
}

10. Conclusion

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of enforcing conditions on a second blockchain transaction using a first blockchain transaction, wherein a first one of the conditions is that, when a first unlocking script of the second transaction is executed alongside a first locking script of the first transaction, a representation of the second transaction is output to memory, wherein the representation is based on a plurality of fields of the second transaction and a first output of the first transaction, and wherein the method comprises:

generating the first transaction, wherein the first transaction comprises a first output, wherein the first output comprises the first locking script, and wherein the first locking script comprises:

a message sub-script configured to, when executed, output to memory a candidate message representing the second transaction, wherein the candidate message is based on a plurality of candidate fields of the first and second transactions, wherein one or more of said candidate fields are included in the first unlocking script of the second transaction;

a signature sub-script configured to, when executed, generate a signature, wherein the signature is a function of at least the candidate message, a private key, and an ephemeral private key, and wherein the ephemeral private key is fixed by the first locking script as being equal to one and/or wherein the ephemeral private key is fixed as being equal to the private key;

a public key corresponding to the private key; and a verification sub-script configured to, when executed, i) construct a target message representing the second transaction, wherein the target message is based on a plurality of fields of the second transaction and the first output of the first transaction, and ii) use the public key to verify that the signature is valid for the target message, wherein verifying that the signature is valid for the target message, verifies that the target message matches the candidate message, thereby verifying that the candidate message output to memory is the representation of the second transaction.

The message constructed by the verification sub-script is based on a plurality of fields taken from the second transaction itself, e.g. the inputs and outputs of the second transaction. In contrast, the candidate message is based on a plurality of fields that are purported to be part of the second transaction.

Verifying that the target message matches the candidate message, and that the candidate message is the representation of the second transaction is a result of the signature being valid for the target message.

Statement 2. The method of statement 1, wherein the private key is fixed by the first locking script as being equal to one.

Statement 3. The method of statement 1 or statement 2, wherein the signature is of the form $s=k^{-1}(z+ra) \bmod n$, where k is the ephemeral private key, a is the private key, z is a hash of the candidate message, n is the integer order of the elliptic curve generator point G, and r is the x-coordinate of an ephemeral public key modulo n.

Statement 4. The method of statement 2 or any statement dependent thereon, wherein the signature is of the form $s=z+G_x \bmod n$, where $G_x$ is the x-coordinate of the elliptic curve generator point G, wherein G is both the ephemeral public key and the public key.

Statement 5. The method of statement 4, wherein the signature sub-script comprises respective values of $G_x$ and n, and wherein the signature is generated based on the respective values of $G_x$ and n.

Statement 6. The method of any preceding statement, wherein the first locking script comprises a distinguished encoding rules, DER, sub-script configured to, when executed, convert the signature to a DER formatted signature, and wherein using the public key to verify that the signature is valid for the target message comprises using the public key to verify that the DER formatted signature is valid for the message.

Statement 7. The method of any preceding statement, wherein the signature sub-script comprises a signature flag specifying which of the plurality of fields of the second transaction are to form the basis of the target message, and wherein the signature verification sub-script is configured to construct the target message based on the signature flag.

Statement 8. The method of statement 7, wherein the signature flag specifies that each input and each output of the second transaction are to form the basis of the target message.

Statement 9. The method of statement 7, wherein the signature flag specifies that a) a first input comprising the first unlocking script of the second transaction, and b) a first output of the second that is paired with the first input, are to form the basis of the target message.

Statement 10. The method of any preceding statement, wherein the candidate message in its entirety is included in the first unlocking script of the second transaction.

Statement 11. The method of any of statements 1 to 9, wherein one or more of the candidate fields are included in the first locking script of the first transaction Statement 12. The method of statement 11, wherein one or more of the following candidate fields are included in the first locking script of the first transaction, thus enforcing the condition that the second transaction comprises the one or more following fields:

version number of the second transaction, length of the first locking script of the first transaction, value of the first locking script of the first transaction, sequence number of the first input of the second transaction, locktime of the second transaction, signature flag of the first unlocking script of the second transaction.

Statement 13. The method of any preceding statement, wherein the candidate message representing the second transaction comprises one or more respective data items that are based on a respective set of one or more respective candidate fields of the second transaction.

Statement 14. The method of statement 13, wherein the one or more respective data items comprises one or more of:

hash of input sequence numbers of the second transaction, hash of combined outputs of the second transaction.

Statement 15. The method of statement 13 or statement 14, wherein the message sub-script is configured to construct said one or more respective data items based on the respective set of candidate fields of the second transaction.

Statement 16. The method of statement 15, wherein the message sub-script is configured to output the one or more respective fields of the second transaction to the memory.

Statement 17. The method of any preceding statement, wherein the memory is a stack-based memory.

Statement 18. The method of statement 17, wherein the signature verification sub-script comprises at least one of a OP_CHECKSIGVERIFY opcode and a OP_CHECKSIG opcode.

Statement 19. The method of statement 5 and statement 17 or statement 18, wherein the stack-based memory comprises a main stack and an alternative stack, wherein the first locking script is configured to use the respective values of $G_x$ and n more than once, and wherein the first locking script is configured to, when executed, output the respective values of $G_x$ and n to the alternative stack and, for each time the respective values of $G_x$ and n are required other than an initial time, obtain the respective values of $G_x$ and n from the alternative stack.

Statement 20. The method of any preceding statement, comprising making the first transaction available to one or more nodes of a blockchain network.

Statement 21. The method of any preceding statement, comprising making the first transaction available to a party for generating the second transaction.

Statement 22. The method of statement 15 or any statement dependent thereon, wherein the message sub-script is configured to re-use at least one of the respective sets of candidate fields as a different respective part of the candidate message.

Statement 23. The method of statement 22, wherein one of said respective parts of the candidate message comprises a hash of one or more outputs of the second transaction, wherein a first respective set of the candidate fields comprises a) a respective length of the first locking script of the first transaction, and b) the first locking script of the first transaction, and wherein the message sub-script is configured to, when executed, generate the hash of the one or more outputs based on candidate fields a) and b), thereby enforcing a condition that a first output of the second transaction comprises the first locking script of the first transaction.

Statement 24. The method of statement 23, wherein the first respective set of the candidate fields comprises c) a respective value locked by the first locking script of the first transaction, and wherein the message sub-script is configured to, when executed, generate the hash of the one or more outputs based on candidate fields a), b) and c), thereby enforcing a condition that a first output of the second transaction comprises the first output of the first transaction.

Statement 25. The method of statement 22 or any statement dependent thereon, wherein the message sub-script is configured to output at least one of the one or more respective parts of the candidate message to the memory.

Statement 26. The method of statement 22 or any statement dependent thereon, wherein the message sub-script is configured, when executed, to duplicate the at least one or the respective sets of candidate fields as part of the candidate message to be re-used as the different respective part of the candidate message.

Statement 27. Computer equipment comprising:

memory comprising one or more memory units; and processing apparatus comprising one or more processing units, wherein the memory stores code arranged to run on the processing apparatus, the code being configured so as when on the processing apparatus to perform the method of any of statements 1 to 26.

Statement 28. A computer program embodied on computer-readable storage and configured so as, when run on one or more processors, to perform the method of any of statements 1 to 26.

The invention claimed is:

1. A computer-implemented method of enforcing conditions on a second blockchain transaction using a first blockchain transaction, wherein a first one of the conditions is that, when a first unlocking script of the second blockchain transaction is executed alongside a first locking script of the first blockchain transaction, a representation of the second blockchain transaction is output to memory, wherein the representation is based on a plurality of fields of the second blockchain transaction and a first output of the first blockchain transaction, and wherein the method comprises:

generating the first blockchain transaction, wherein the first blockchain transaction comprises a first output, wherein the first output comprises the first locking script, and wherein the first locking script comprises:

a message sub-script constructed and arranged so as to, when executed by a blockchain node, cause the blockchain node to output to memory a candidate message representing the second blockchain transaction, wherein the candidate message is based on a plurality of candidate fields of the first and second blockchain transactions, wherein one or more of said candidate fields are included in the first unlocking script of the second blockchain transaction;

a signature sub-script constructed and arranged so as to, when executed by a blockchain node, cause the blockchain node to generate a signature, wherein the signature is a function of at least the candidate message, a private key, and an ephemeral private key, and wherein the ephemeral private key is fixed by the first locking script as being equal to one and/or wherein the ephemeral private key is fixed as being equal to the private key;

a public key corresponding to the private key; and a verification sub-script constructed and arranged so as to, when executed constructed and arranged so as, cause the blockchain node to i) construct a target message representing the second blockchain transaction, wherein the target message is based on a plurality of fields of the second blockchain transaction and the first output of the first blockchain transaction, and ii) use the public key to verify that the signature is valid for the target message, wherein verifying that the signature is valid for the target message, verifies that the target message matches the candidate message, thereby verifying that the candidate message output to memory is the representation of the second blockchain transaction.

2. The method of claim 1, wherein the private key is fixed by the first locking script as being equal to one.

3. The method of claim 1, wherein the signature is of the form, $s=k^{-1}(z+ra) \bmod n$ where k is the ephemeral private key, a is the private key, z is a hash of the candidate message, n is the integer order of the elliptic curve generator point, G and r is the x-coordinate of an ephemeral public key modulo n.

4. The method of claim 2, wherein the signature is of the form, $s=z+G_x \bmod n$ where $G_x$ is the x-coordinate of the elliptic curve generator point, G wherein G is both the ephemeral public key and the public key.

5. The method of claim 4, wherein the signature sub-script comprises respective values of $G_x$ and, n and wherein the signature is generated based on the respective values of $G_x$ and n.

6. The method of claim 1, wherein the signature sub-script comprises a signature flag specifying which of the plurality of fields of the second blockchain transaction are to form the basis of the target message, and wherein the signature verification sub-script is configured to construct the target message based on the signature flag.

7. The method of claim 6, wherein the signature flag specifies that each input and each output of the second blockchain transaction are to form the basis of the target message.

8. The method of claim 6, wherein the signature flag specifies that a) a first input comprising the first unlocking script of the second blockchain transaction, and b) a first output of the second that is paired with the first input, are to form the basis of the target message.

9. The method of claim 1, wherein the candidate message in its entirety is included in the first unlocking script of the second blockchain transaction.

10. The method of claim 1, wherein one or more of the candidate fields are included in the first locking script of the first blockchain transaction.

11. The method of claim 10, wherein one or more of the following candidate fields are included in the first locking script of the first transaction, thus enforcing the condition that the second transaction comprises the one or more following fields:

version number of the second blockchain transaction, length of the first locking script of the first blockchain transaction, value of the first locking script of the first blockchain transaction, sequence number of the first input of the second blockchain transaction, locktime of the second blockchain transaction, signature flag of the first unlocking script of the second blockchain transaction.

12. The method of claim 1, wherein the candidate message representing the second transaction comprises one or more respective data items that are based on a respective set of one or more respective candidate fields of the second transaction.

13. The method of claim 12, wherein the one or more respective data items comprises one or more of:

hash of input sequence numbers of the second blockchain transaction, hash of combined outputs of the second blockchain transaction.

14. The method of claim 12, wherein the message sub-script is configured and arranged so as to, when executed by the blockchain node, cause the blockchain node to construct said one or more respective data items based on the respective set of candidate fields of the second blockchain transaction.

15. The method of claim 5, wherein the memory is a stack-based memory, the signature verification sub-script comprises at least one of a OP_CHECKSIGVERIFY opcode and a OP_CHECKSIG opcode, and the stack-based memory comprises a main stack and an alternative stack, wherein the first locking script is configured to use the respective values of $G_x$ and n more than once, and wherein the first locking script is configured to, when executed, output the respective values of $G_x$ and n to the alternative stack and, for each time the respective values of $G_x$ and n are required other than an initial time, obtain the respective values of $G_x$ and n from the alternative stack.

16. The method of claim 14, wherein the message sub-script is constructed and arranged so as to, when executed by the blockchain node, cause the blockchain node to re-use at least one of the respective sets of candidate fields as a different respective part of the candidate message.

17. The method of claim 16, wherein one of said respective parts of the candidate message comprises a hash of one or more outputs of the second blockchain transaction, wherein a first respective set of the candidate fields comprises a) a respective length of the first locking script of the first blockchain transaction, and b) the first locking script of the first blockchain transaction, and wherein the message sub-script is constructed and arranged so as to, when executed by the blockchain node, cause the blockchain node to generate the hash of the one or more outputs based on candidate fields a) and b), thereby enforcing a condition that a first output of the second transaction comprises the first locking script of the first blockchain transaction.

18. The method of claim 16, wherein the message sub-script is constructed and arranged so as to, when executed by the blockchain node, cause the blockchain node to duplicate the at least one or the respective sets of candidate fields as part of the candidate message to be re-used as the different respective part of the candidate message.

19. Computer equipment, comprising:

memory comprising one or more memory units; and processing apparatus comprising one or more processing units, wherein the memory stores code arranged to run on the processing apparatus, the code being configured so as when run on the processing apparatus, the processing apparatus is configured to enforce conditions on a second blockchain transaction using a first blockchain transaction, wherein a first one of the conditions is that, when a first unlocking script of the second blockchain transaction is executed alongside a first locking script of the first blockchain transaction, a representation of the second blockchain transaction is output to memory, wherein the representation is based on a plurality of fields of the second blockchain transaction and a first output of the first blockchain transaction by:

generating the first blockchain transaction, wherein the first blockchain transaction comprises a first output, wherein the first output comprises the first locking script, and wherein the first locking script comprises:

a message sub-script constructed and arranged so as to, when executed by a blockchain node, cause the blockchain node to output to memory a candidate message representing the second blockchain transaction, wherein the candidate message is based on a plurality of candidate fields of the first and second blockchain transactions, wherein one or more of said candidate fields are included in the first unlocking script of the second blockchain transaction;

a signature sub-script constructed and arranged so as to, when executed by a blockchain node, cause the blockchain node to generate a signature, wherein the signature is a function of at least the candidate message, a private key, and an ephemeral private key, and wherein the ephemeral private key is fixed by the first locking script as being equal to one and/or wherein the ephemeral private key is fixed as being equal to the private key;

a public key corresponding to the private key; and a verification sub-script constructed and arranged so as to, when executed by a blockchain node, cause the blockchain node to i) construct a target message representing the second blockchain transaction, wherein the target message is based on a plurality of fields of the second blockchain transaction and the first output of the first blockchain transaction, and ii)

use the public key to verify that the signature is valid for the target message, wherein verifying that the signature is valid for the target message, verifies that the target message matches the candidate message, thereby verifying that the candidate message output to memory is the representation of the second blockchain transaction.

20. A computer program embodied on non-transitory computer-readable storage media and configured so as, when run on one or more processors, the one or more processors perform a method of enforcing conditions on a second blockchain transaction using a first blockchain transaction, wherein a first one of the conditions is that, when a first unlocking script of the second blockchain transaction is executed alongside a first locking script of the first transaction, a representation of the second blockchain transaction is output to memory, wherein the representation is based on a plurality of fields of the second blockchain transaction and a first output of the first blockchain transaction, and wherein the method comprises:

generating the first blockchain transaction, wherein the first blockchain transaction comprises a first output, wherein the first output comprises the first locking script, and wherein the first locking script comprises:

a message sub-script constructed and arranged so as to, when executed by a blockchain node, cause the blockchain node to output to memory a candidate message representing the second blockchain transaction, wherein the candidate message is based on a plurality of candidate fields of the first and second blockchain transactions, wherein one or more of said candidate fields are included in the first unlocking script of the second blockchain transaction;

a signature sub-script constructed and arranged so as to, when executed by a blockchain node, cause the blockchain node to generate a signature, wherein the signature is a function of at least the candidate message, a private key, and an ephemeral private key, and wherein the ephemeral private key is fixed by the first locking script as being equal to one and/or wherein the ephemeral private key is fixed as being equal to the private key;

a public key corresponding to the private key; and a verification sub-script constructed and arranged so as to, when executed by a blockchain node, cause the blockchain node to i) construct a target message representing the second blockchain transaction, wherein the target message is based on a plurality of fields of the second blockchain transaction and the first output of the first blockchain transaction, and ii) use the public key to verify that the signature is valid for the target message, wherein verifying that the signature is valid for the target message, verifies that the target message matches the candidate message, thereby verifying that the candidate message output to memory is the representation of the second blockchain transaction.

* * * * *